(12) United States Patent
Suzuki

(10) Patent No.: US 6,285,501 B1
(45) Date of Patent: Sep. 4, 2001

(54) ZOOM LENS HAVING A LONG BACK FOCAL LENGTH WITH VIBRATION REDUCTION FUNCTION

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/492,179

(22) Filed: Jan. 27, 2000

(30) Foreign Application Priority Data

Jan. 27, 1999 (JP) .................................................. 11-018086

(51) Int. Cl.$^7$ ............................ G02B 27/64; G02B 15/14
(52) U.S. Cl. ......................... 359/554; 359/557; 359/682; 359/683
(58) Field of Search .................................. 359/554, 557, 359/676, 682, 683, 684, 680

(56) References Cited

U.S. PATENT DOCUMENTS

| | | | |
|---|---|---|---|
| 5,585,966 | 12/1996 | Suzuki | 359/557 |
| 5,898,525 | 4/1999 | Suzuki | 359/684 |
| 6,141,156 | * 10/2000 | Aoki | 359/686 |

* cited by examiner

*Primary Examiner*—Scott J. Sugarman
*Assistant Examiner*—Michael A. Lucas
(74) *Attorney, Agent, or Firm*—Vorys, Sater, Seymour and Pease LLP

(57) ABSTRACT

A high-performance zoom lens having a long back focal length and thus ideally suitable to electronic imaging equipment. The zoom lens comprises a first lens group G1 having a positive refractive power, a second lens group G2 having a, negative refractive power, a third lens group G3 having a negative refractive power, a fourth lens group G4 having a positive refractive power, and a fifth lens group G5 having a positive refractive power. When zooming from the wide-angle end to the telephoto end, the air gap between the first lens group G1 and the second lens group G2 increases, the air gap between the second lens group G2 and the third lens group G3 changes, and the air gap between the fourth lens group G4 and the fifth lens group G5 changes.

Vibration reduction is attained by displacing (shifting) a vibration reduction lens group G4v consisting of the fourth lens group G4 or a partial lens group in said fourth lens group in a direction substantially perpendicular to the optical axis.

21 Claims, 12 Drawing Sheets

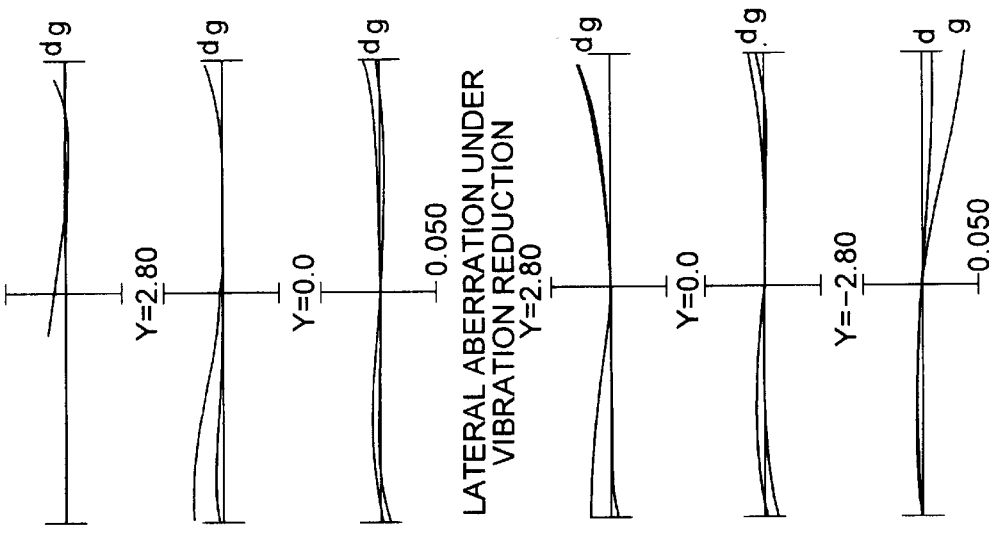
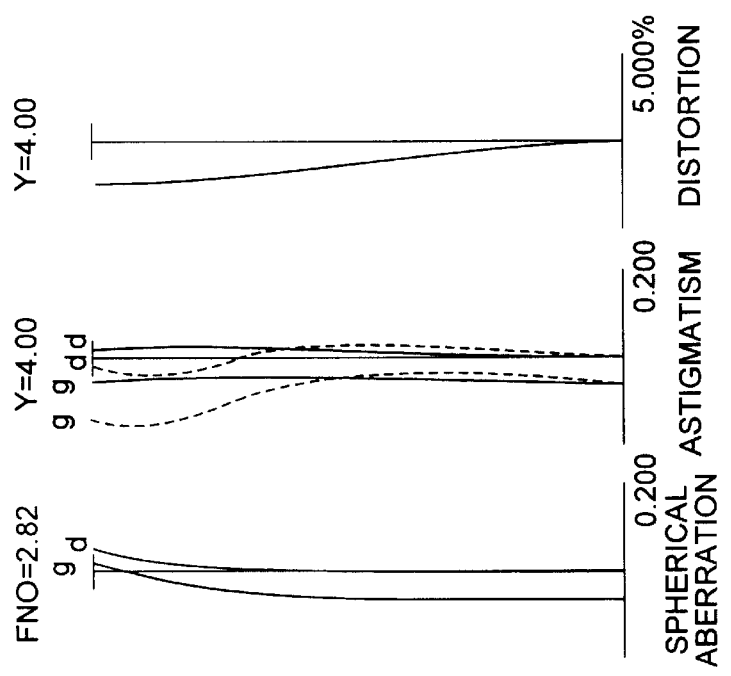
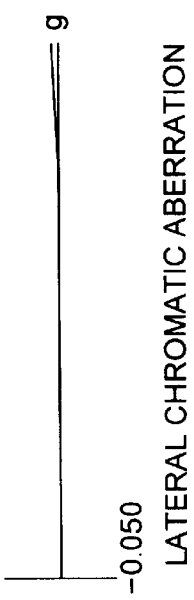

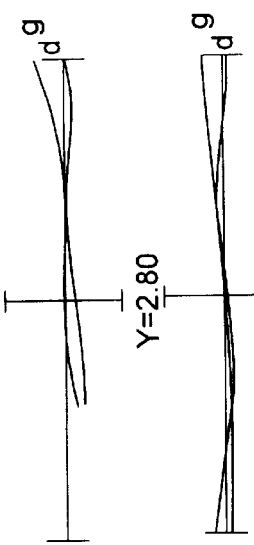
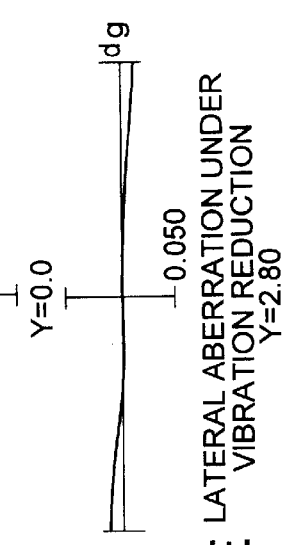
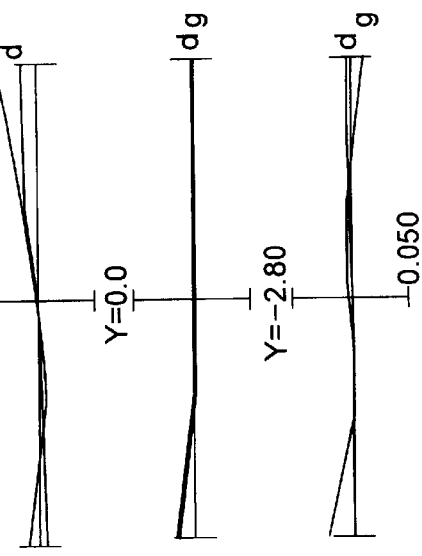
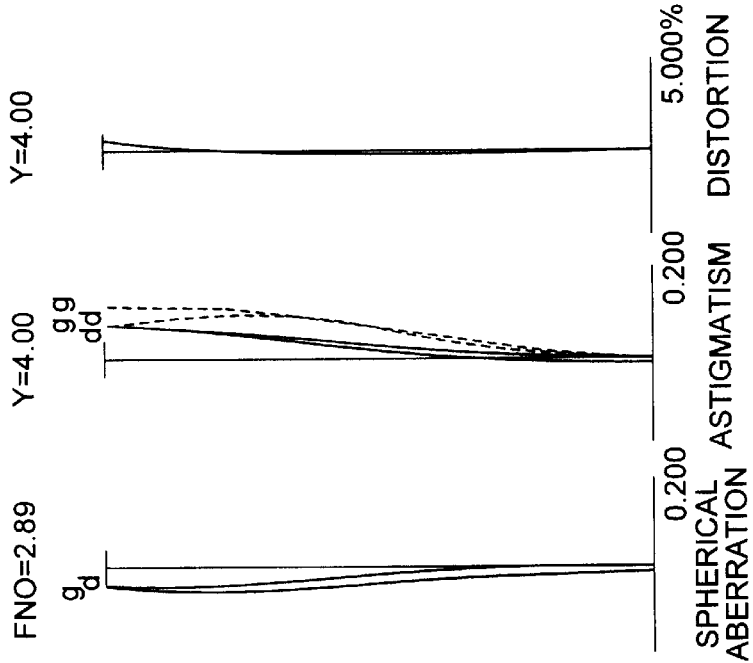
FIG. 3A  FIG. 3B  FIG. 3C
FIG. 3D LATERAL ABERRATION WITHOUT VIBRATION REDUCTION
FIG. 3E LATERAL ABERRATION UNDER VIBRATION REDUCTION
FIG. 3F

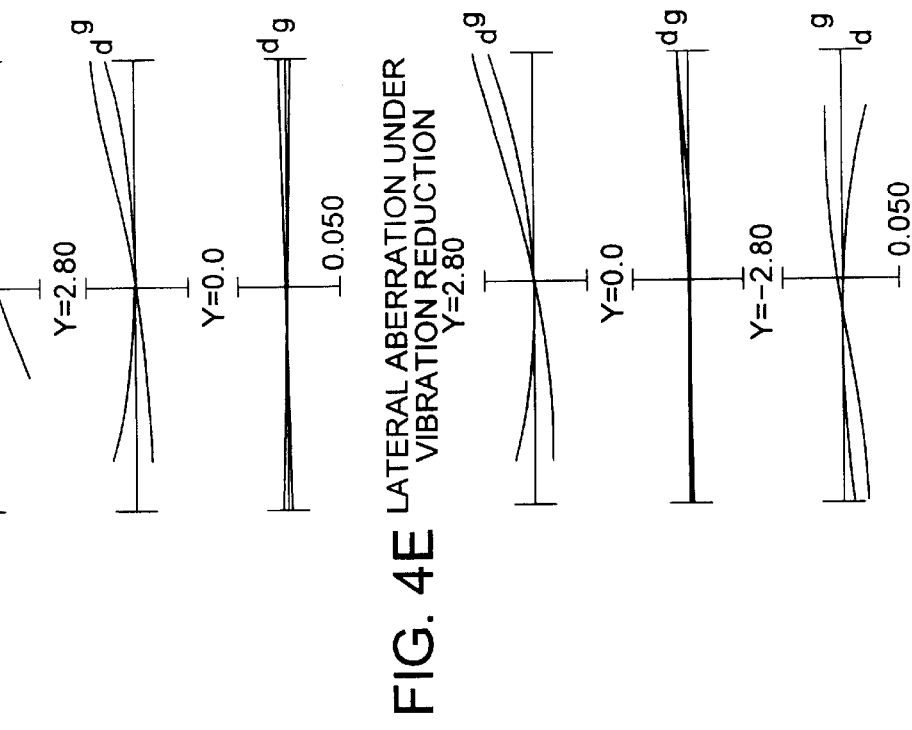
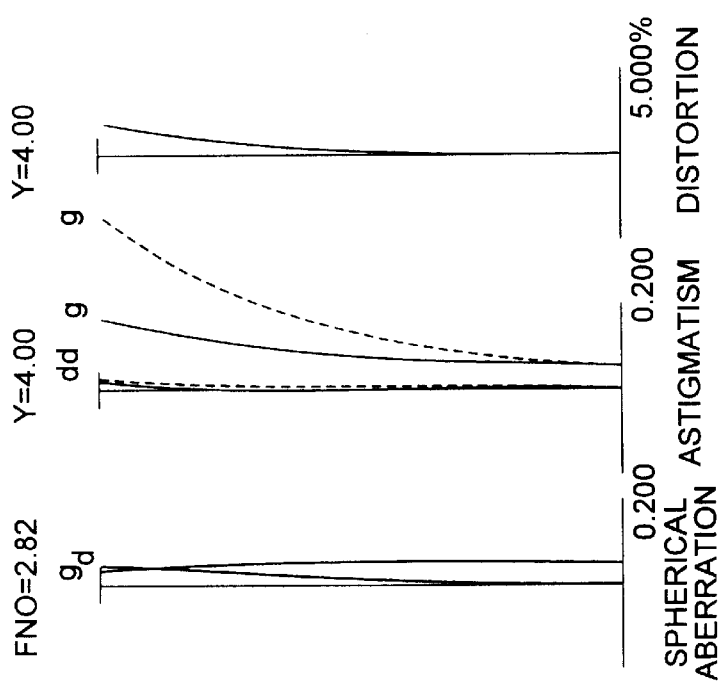

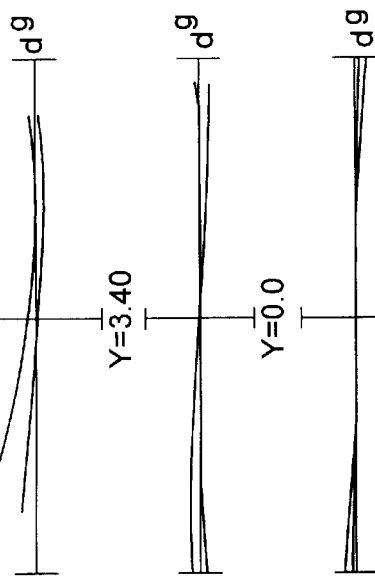
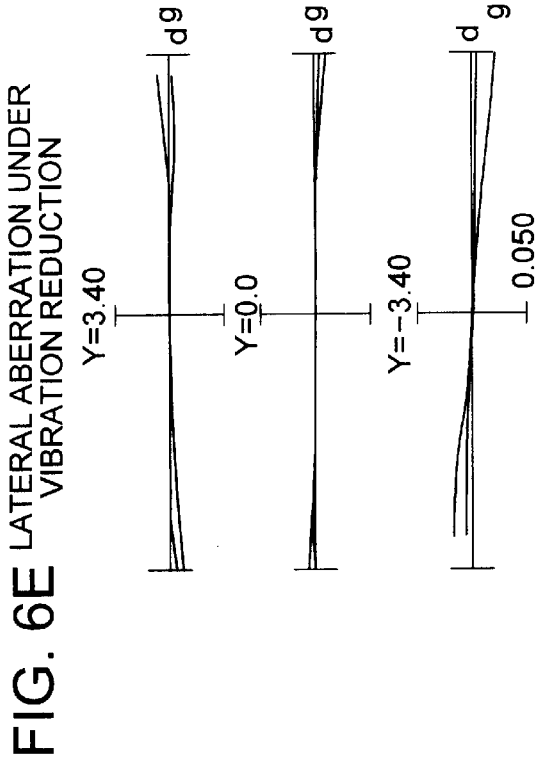
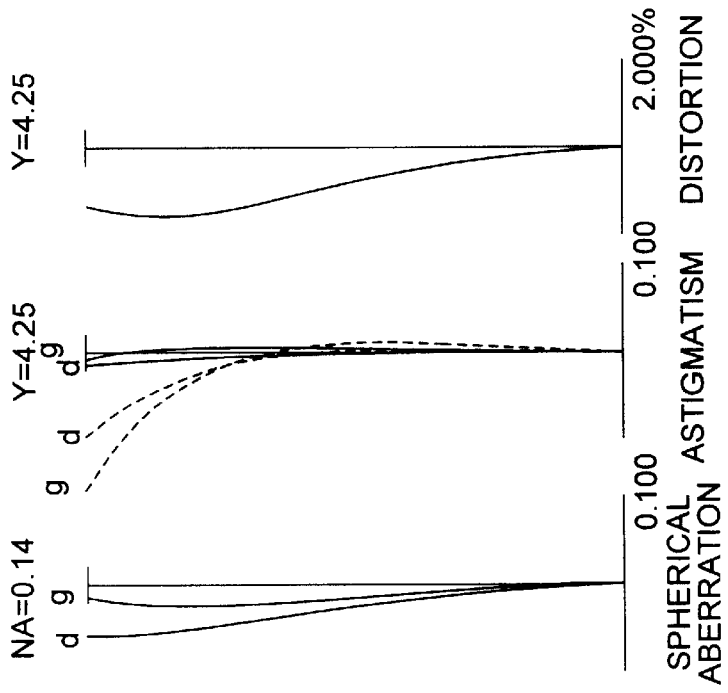
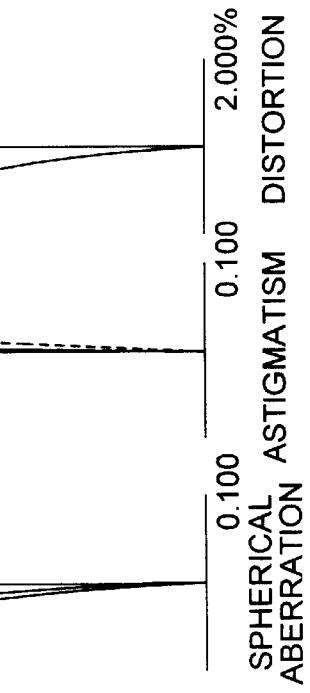
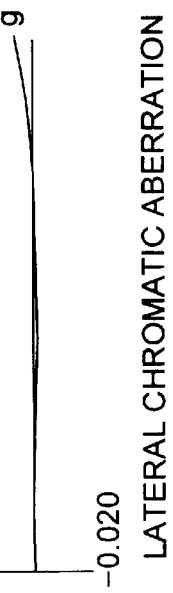

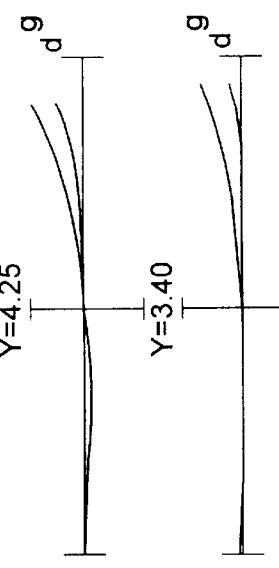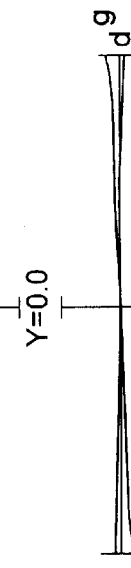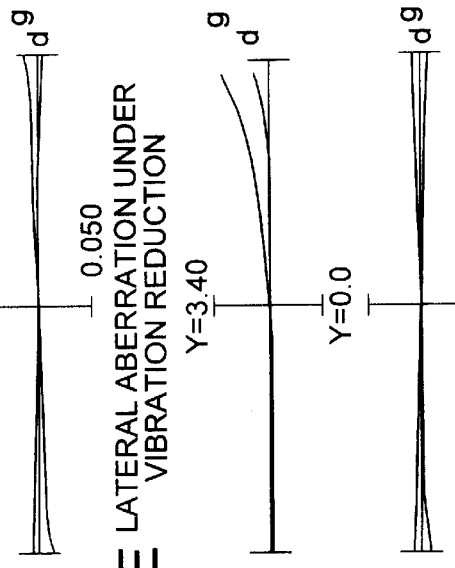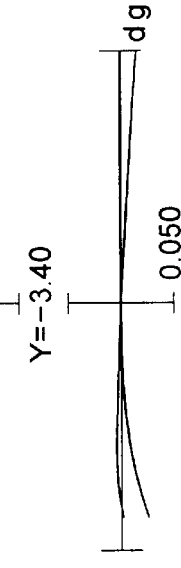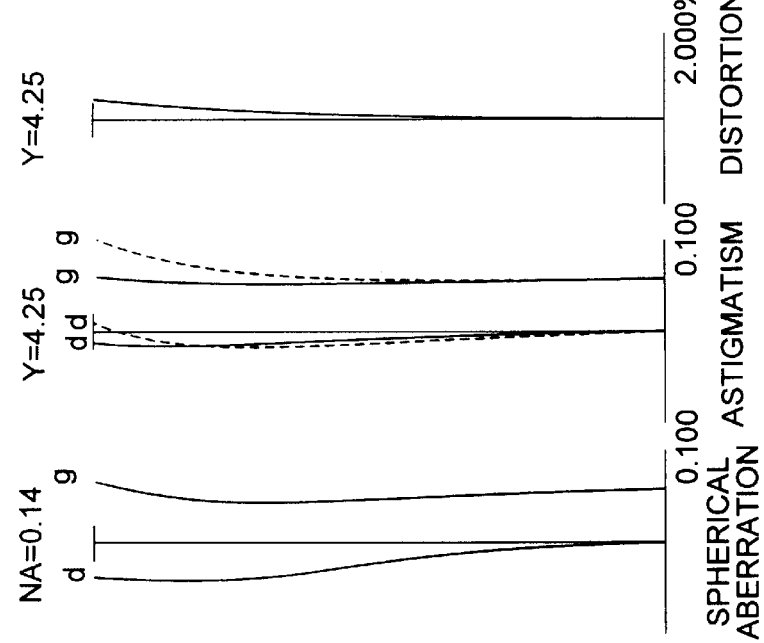
FIG. 7A  FIG. 7B  FIG. 7C
FIG. 7D LATERAL ABERRATION WITHOUT VIBRATION REDUCTION
FIG. 7E LATERAL ABERRATION UNDER VIBRATION REDUCTION
FIG. 7F

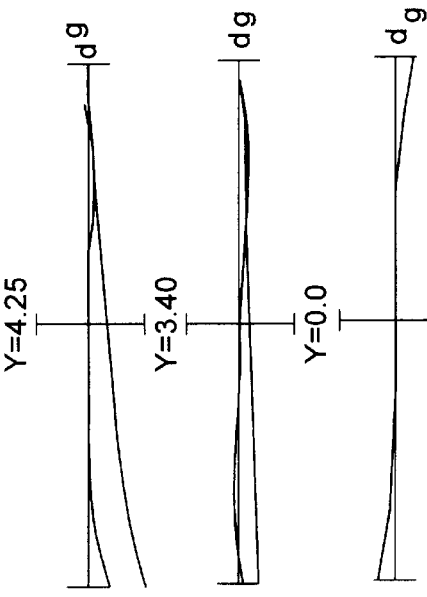
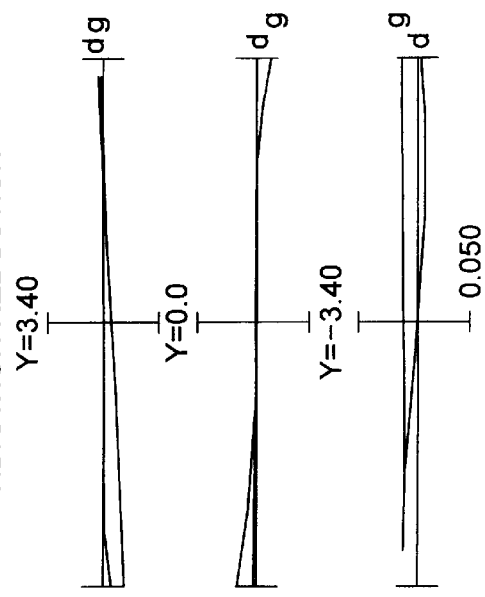
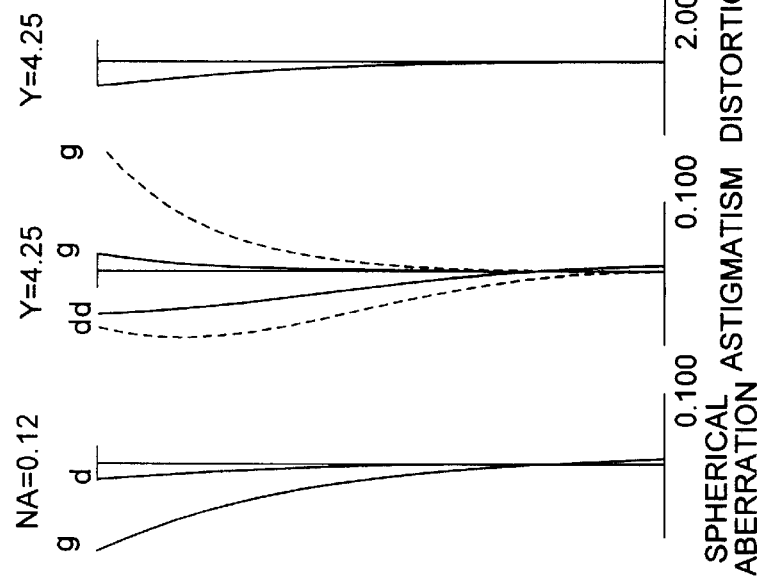

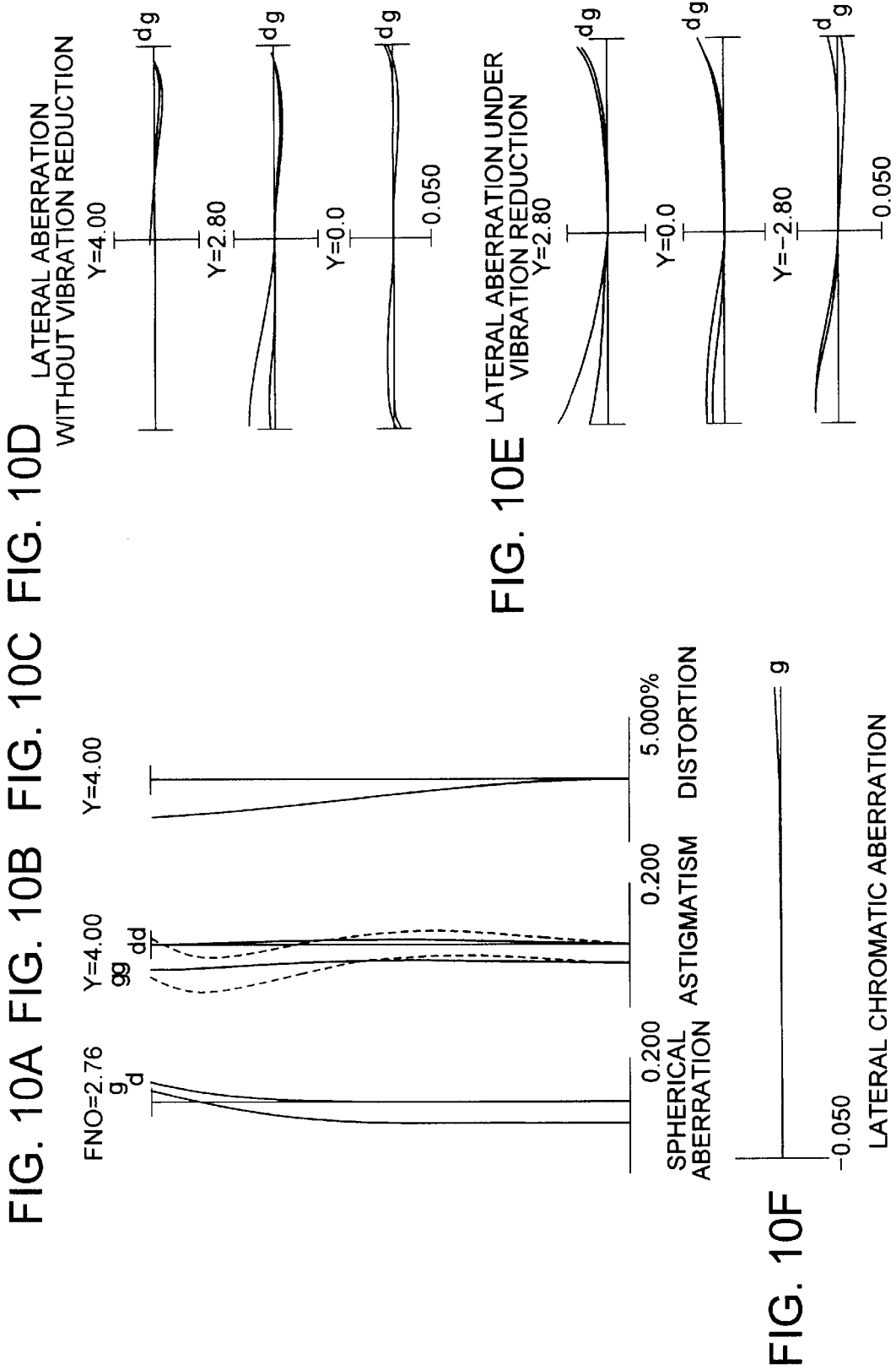

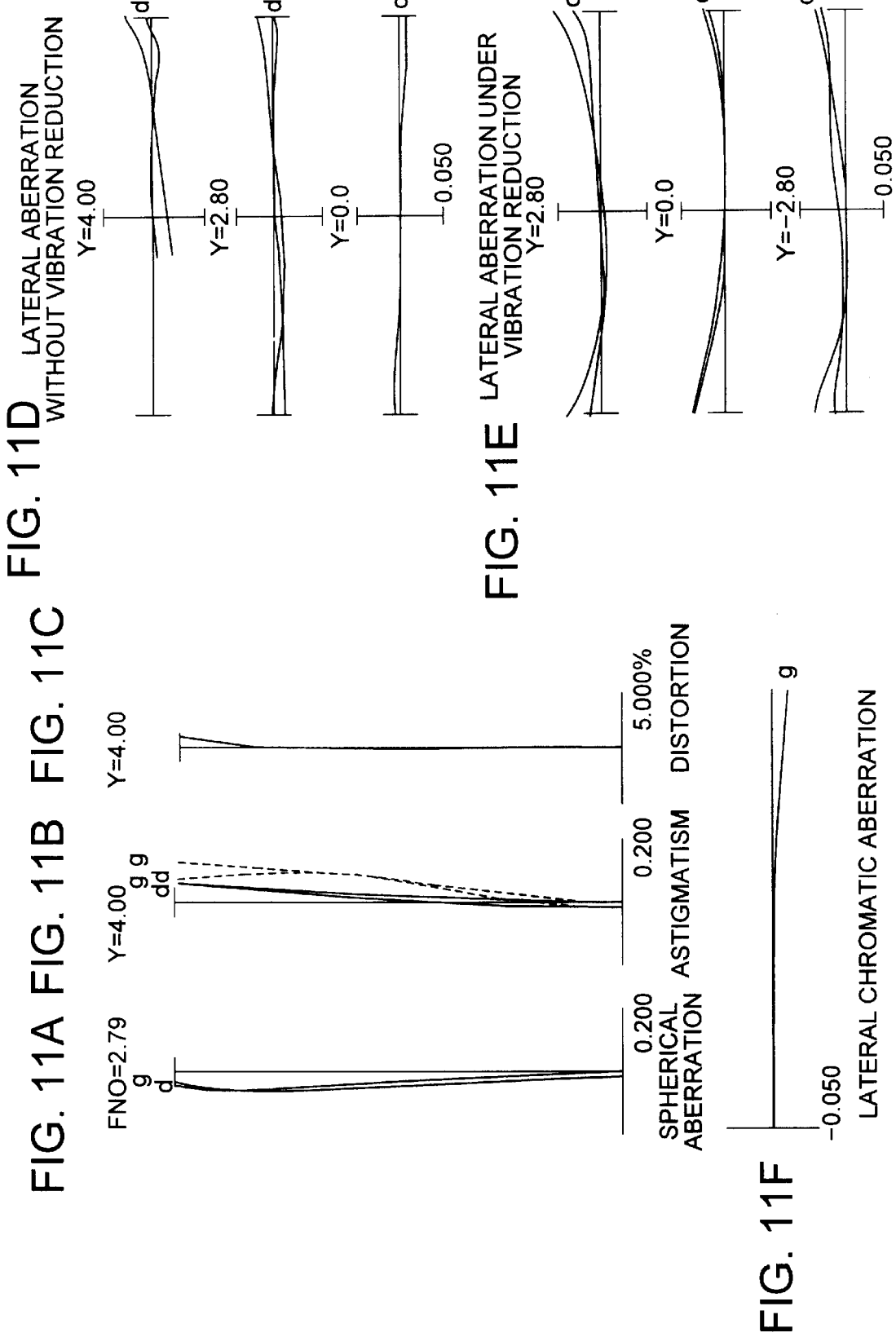

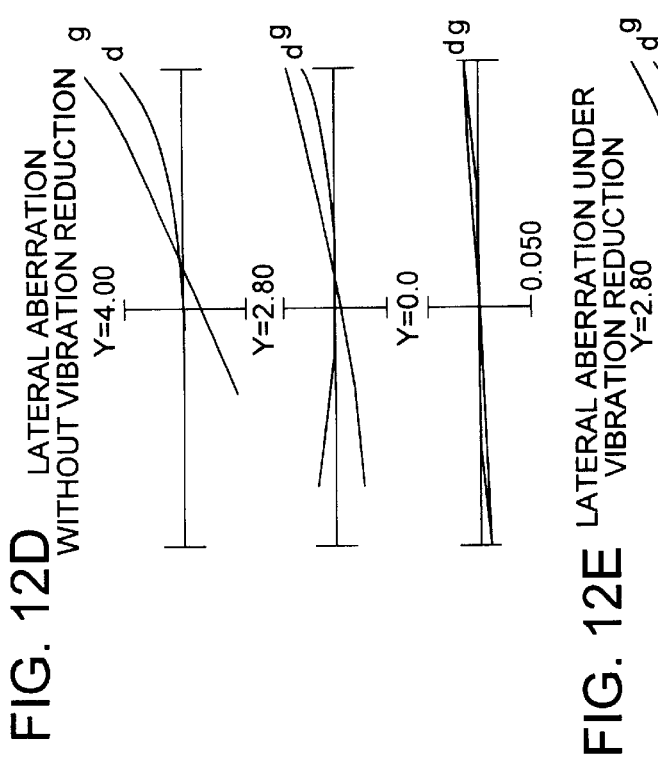
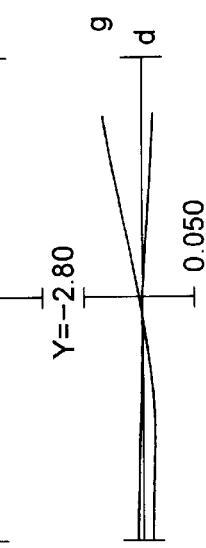
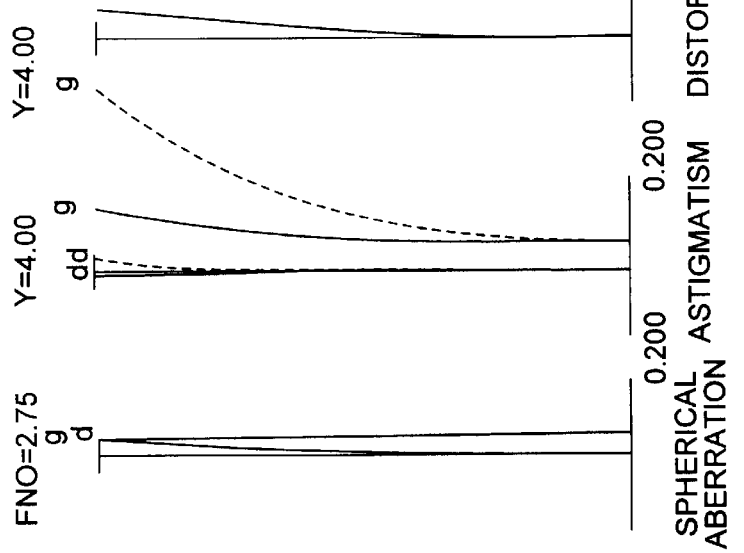
FIG. 12A  FIG. 12B  FIG. 12C  FIG. 12D  FIG. 12E  FIG. 12F

ZOOM LENS HAVING A LONG BACK FOCAL LENGTH WITH VIBRATION REDUCTION FUNCTION

This application claims the benefit of Japanese Patent application No. 11-018086 which is hereby incorporated by reference.

BACKGROUND OF THE INVENTION

1. Field of the Invention

The present invention relates to a zoom lens with a vibration reduction function and, more particularly, to a vibration reduction technology for zoom lenses having a long back focal length so as to suitable for use with an electronic image equipment employing CCD imaging devices and the like.

2. Related Background Art

The demand for increased performance of zoom lenses in recent years has resulted in a variety of types of zoom lenses. In particular, zoom lenses for an electronic image equipment, such as video cameras and digital still cameras, have employed to date so-called Yamaji-type zoom lenses and four-group type zoom lenses having, in order from object side, positive-negative-positive-positive refractive power arrangement. However, disclosure of a vibration reduction method relating to these types of zoom lenses is rare and, so far, only one publication of Japanese Laid-Open Patent Application No. 7-199124, filed by the present applicant, is known. With the progress in lens barrel technology in recent years, zoom lens types having five or more lens groups have been proposed. However, it has been extremely difficult to simultaneously achieve superior imaging performance, superior vibration reduction function, an increased field of view, increased variable power (i.e. an increased zoom ratio), a compact size, and the like.

SUMMARY OF THE INVENTION

An object of the present invention is to provide a high-performance zoom lens having superior vibration reduction function with a long back focal length and that has superior imaging performance even in the intermediate focal length state. The zoom lens also has satisfactory imaging performance in an optical system for focusing an object at infinite distance (hereinafter referred as "infinite focus") as well as an optical system for focusing an object at short distance (hereinafter referred as "short-distance focus").

In order to achieve the above object, according to the present invention, a zoom lens having a long back focal length, which comprises, in order from an object side:

a first lens group G1 having a positive refractive power;

a second lens group G2 having a negative refractive power;

a third lens group G3 having a negative refractive power;

a fourth lens group G4 having a positive refractive power; and a fifth lens group G5 having a positive refractive power;

wherein the zoom lens is designed such that when zooming is effected from the wide-angle end to the telephoto end, the interval between the first lens group G1 and the second lens group G2 increases, the interval between the second lens group G2 and the third lens group G3 changes linearly or non-linearly, and the interval between the fourth lens group G4 and the fifth lens group G5 changes linearly or non-linearly;

wherein vibration reduction is attained by shifting a vibration reduction lens group G4v consisting of the fourth lens group G4 or a partial lens group of the fourth lens group in a direction substantially perpendicular to an optical axis; and wherein the following conditional formulae are satisfied:

$$\Delta 4/|f4v|<0.1$$

where f4v is a focal length of the vibration reduction lens group G4v, $\Delta 4$ is a maximum displacement amount of the vibration reduction lens group G4v in the direction substantially perpendicular to the optical axis upon vibration reduction.

According to a preferred aspect of the present invention, a zoom lens satisfies the following conditional formulae:

$$2.0<BFw/Y0<8.0$$

$$0.03<(D23t-D23w)/fw<1.5$$

where BFw is the back focal length at the wide-angle end, Y0 is a maximum image height, fw is the focal length of the entire zoom lens system at the wide-angle end, D23w is the interval along the optical axis between the second lens group G2 and the third lens group G3 at the wide-angle end, and D23t is the interval along the optical axis between the second lens group G2 and the third lens group G3 at the telephoto end.

According to a preferred aspect of the present invention, a zoom lens further satisfies the following conditional formulae:

$$0.1<f2/f3<2.0$$

$$2.0<|f3|/fw<10.0$$

wherein f2 is a focal length of the second lens group G2, f3 is a focal length of the third lens group G3, and fw is the focal Length of the zoom lens at the wide-angle end.

According to a preferred aspect of the present invention of a zoom lens, the first lens group G1 and the fourth lens group G4 is fixed during zooming from the wide-angle end to the telephoto end, and the following condition is satisfied:

$$0.001<\Delta 4/\Phi 4<0.2$$

where $\Phi 4$ is a diameter of an effective aperture at the most object side of the fourth lens group G4 and $\Delta 4$ is a maximum displacement amount of the vibration reduction lens group G4v in the direction substantially perpendicular to the optical axis while attaining vibration reduction.

According to a preferred aspect of the present invention of a zoom lens, the fifth lens group G5 includes a cemented lens having a divergent convex cemented surface facing to the image side.

According to a preferred aspect of the present invention of a zoom lens further satisfies the following conditional formula:

$$0.3<D23m/fw<3.0$$

wherein D23m is an interval along the optical axis between the second lens group G2 and the third lens group G3 in an intermediate focal length state, and fw is the focal length of the zoom lens at the wide-angle end.

According to a preferred aspect of the present invention, a zoom lens further satisfies the following conditional formulae:

$$0.5<|f23w|/fw<2.0$$

$$0.3<D23t/fw<1.5$$

wherein f23w is a composite focal length of the second lens group G2 and the third lens group G3 at the wide-angle end, fw is the focal length of the zoom lens at the wide-angle end, and D23t is an interval along an optical axis between the second lens group G2 and the third lens group G3 at the telephoto end.

According to a preferred aspect of the present invention of a zoom lens, the fourth lens group G4 includes a positive lens; L4p arranged at the most object side and negative lens L4n arranged at the most image side; the fifth lens group G5 include a cemented lens having a divergent convex cemented surface facing to the image side; and the following conditional formula is satisfied:

$$0.18<\Delta N$$

wherein $\Delta N$ is a mean value of a difference of a refractive index for d-line between the positive lens L4p and the negative: lens L4n of the fourth lens group G4, and a difference of a refractive index for d-line between the object side lens and the image side lens that interpose the cemented surface in the fifth lens group G5.

According to a preferred aspect of the present invention, a zoom lens further satisfies the following conditional formula:

$$0.00001<PTZ\cdot\Delta 4/f4<0.0001$$

wherein PZT is Petzval sum of the vibration reduction lens group G4v, f4 is focal length of the fourth lens group G4, aind $\Delta 4$ is a maximum displacement amount of the vibration reduction lens group G4v in the direction substantially perpendicular to the optical axis upon vibration reduction.

BRIEF DESCRIPTION OF THE DRAWINGS

FIGS. 2A to 2F are graphs showing aberrations for Working Example 1 at the wide-angle end focused on an infinite object.

FIGS. 3A to 3F are graphs showing aberrations for Working Example 1 in the intermediate state focused on an infinite object.

FIGS. 4A to 4F are graphs showing aberrations for Working Example 1 at the telephoto end focused on an infinite object.

FIGS. 6A to 6F are graphs showing aberrations for Working Example 2 at the wide-angle end focused on a finite object.

FIGS. 7A to 7F are graphs showing aberrations for Working Example 2 in the intermediate state focused on a finite object.

FIGS. 8A to 8F are graphs showing aberrations for Working Example 2 at the telephoto end focused on a finite object.

FIGS. 10A to 10F are graphs showing aberrations for Working Example 3 at the wide-angle end focused on an infinite object.

FIGS. 11A to 11F are graphs showing aberrations for Working Example 3 in the intermediate state focused on an infinite object.

FIGS. 12A to 12F are graphs showing aberrations for Working Example 3 at the telephoto end focused on an infinite object.

DESCRIPTION OF THE PREFERRED EMBODIMENT

Figure 1A:
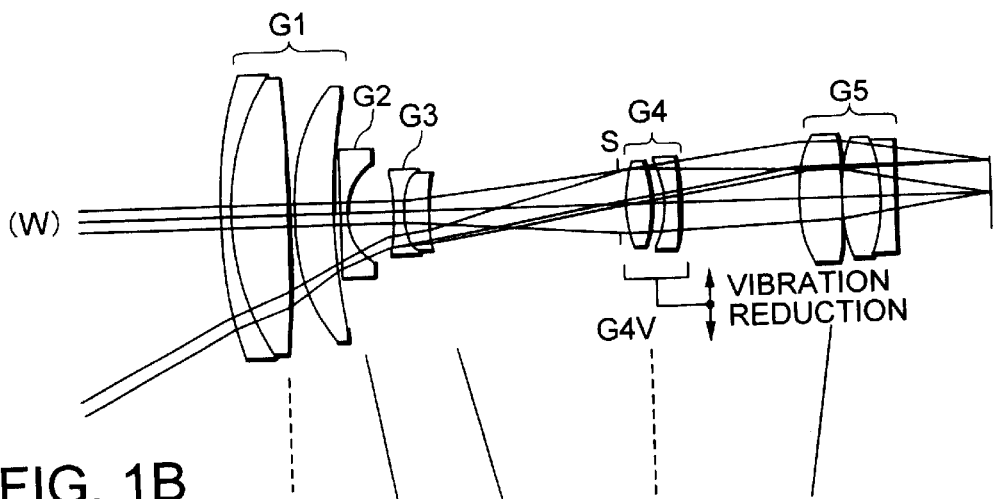
FIGS. 1A to 1C shows a construction of a zoom lens according to a Working Example 1 of the present invention, and shows trajectory of each lens group when the focal length of the zoom lens changes from the wide-angle end(W) to the telephoto end(T) by way of the intermediate state(M).

The present invention relates to a zoom lens with a vibration reduction function and, more particularly, to a vibration reduction method for zoom lenses having a long back focal length so as to suitable for use with electronic image equipment employing CCD imaging devices and the like. An object of the present invention is to provide a high-performance zoom lens having superior vibration reduction function with a long back focal length and that has superior imaging performance even in the intermediate focal length state. The zoom lens also has satisfactory imaging performance at infinite focus as well as short-distance focus.

At first, as a general consideration, a characteristic feature of a multi-group zoom lens is explained. Sincia at least two lens groups are necessary to configure a zoom lens, a multi-group configuration, as the term is used herein, signifies a zoom lens configuration having three or more lens groups.

The number of lens groups that contribute to the variation in power of the zoom lens increases with a multi-group zoom lens. Thus, it is possible to increase the magnification of a zoom lens by employing multiple lens groups. In addition, since it is easier to equalize the aberration correction burden of each lens group, it is possible to achieve superior imaging performance. Multi-group zoom lenses have an inconvenience such that a construction of a zoom lens barrel is complicated due to the increase in the number of movable lens groups. However, the problems associated with this complexity continue to be overcome with the progress in zoom lens barrel technology.

In light of the background of the above mentioned multiple group zoom lens, the present invention adopts a five-group configuration having, in order from object side, positive-negative-negative-positive-positive refractive power arrangement. The present invention has many degrees of freedom for aberration correction, including degrees of freedom of movement of each lens group due to the increased number of lens groups. As a result, a zoom lens having a high magnification can be realized. Moreover, superior imaging performance can be obtained in the intermediate focal length state, in addition to the wide-angle end and the telephoto end. Further, a zoom lens having a long back focal length can be obtained which has satisfactory imaging performance at infinite focus or short-distance focus. Such a zoom lens is ideally suited for use with electronic image equipment, for example.

In the present invention, it is possible to attain vibration reduction by shifting a vibration reduction lens group G4v consisting of a fourth lens group G4 or a partial lens group in the fourth lens group in a direction substantially perpendicular to the optical axis. It is found that good imaging performance for a zoom lens is assured upon vibration reduction. By the way, 'vibration reduction' means correcting a fluctuation in image position caused. by, e.g., a camera shake by some way. In the present invention, a fluctuation in an image position (image blurring) caused by a camera shake is corrected by shifting a vibration reduction lens group G4v consisting of a fourth lens group G4 or a partial lens group in the fourth lens group in a direction substantially perpendicular to the optical axis. It is described below that the reason why the fourth lens group G4 or a partial lens group in the fourth lens group is chosen as a vibration reduction lens group G4v.

If a first lens group G1, which is large in size, is selected as a vibration reduction lens group, the driving mechanism becomes complicated. Therefore, this (lens group G1) is not desirable for a vibration reduction lens group. If a movable lens group such as the second lens group G2, the third lens group G3, or the fifth lens group G5, which moves along the optical axis upon varying magnification, is, selected as a vibration reduction lens group, the driving mechanism becomes also complicated. Therefore, this(lens group G2, G3or G5) is not desirable for a vibration reduction lens group.

In consideration of the above discussion, since the fourth lens group G4 is relatively small, and is possible to be a fixed lens group, which does not move along the optical axis upon varying magnification, it is desirable that the fourth lens group G4 or a partial lens group in the fourth lens group is chosen as a vibration reduction lens group G4v. Moreover, when an aperture diaphragm is arranged near the fourth lens group G4, it is found that the variation of aberration and the degradation of imaging performance upon vibration reduction are both small. To arrange an aperture diaphragm near the fourth lens group G4 in a fixed manner is not only mechanically desirable, but also desirable in imaging performance because the aperture diaphragm can also be used as a stop for stray light upon vibration reduction.

A zoom lens system according to the present invention will be described in detail in accordance with explanation of the following conditions. According to the present invention, the zoom lens satisfies the following conditional formulae:

$$\Delta 4/|f4v|<0.1 \quad (1)$$

$$2.0<BFw/Y0<8.0 \quad (2)$$

$$0.03<(D23t-D23w)/fw<1.5 \quad (3)$$

where the reference symbol f4v represents a focal length of a vibration reduction lens group G4v, the reference symbol $\Delta 4$ represents a maximum displacement amount of the vibration reduction lens group G4v in the direction substantially perpendicular to the optical axis while attaining vibration reduction, the reference symbol BFw represents the back focal length at the wide-angle end, the reference symbol Y0 represents a maximum image height, the reference symbol fw represents the focal length of the entire lens system at the wide-angle end, the reference symbol D23w represents the interval along the optical axis between the second lens group G2 and the third lens group G3 at the wide-angle end, and the reference symbol D23t represents the interval along the optical axis between the second lens group G2 and the third lens group G3 at the telephoto end.

Conditional formula (1) defines the ratio of the maximum displacement amount $\Delta 4$ of the vibration reduction lens group G4v (a value of the maximum displacement amount along to the direction substantially perpendicular to the optical axis) to the focal length f4v of the vibration reduction lens group G4v. As for the vibration reduction lens group G4v, either the whole lens element of the fourth lens group G4 or a partial lens group in the fourth lens group can be used. When a partial lens group in the fourth lens group G4 is used as the vibration reduction lens group G4v, it is useful for miniaturizing the vibration reduction lens group G4v. When a partial lens group in the fourth lens group G4 is used as the vibration reduction lens group G4v, the refractive power of the vibration reduction lens group G4v can be made either positive or negative. In order to keep superior imaging performance upon vibration reduction, it is desirable for the vibration reduction lens group G4v to have positive refractive power.

When the ratio exceeds the upper limit of the conditional formula (1), the maximum displacement amount of the vibration reduction lens group G4v becomes large. As a result, the variation of aberration upon vibration reduction becomes too large to obtain good imaging performance. In particular, at a peripheral portion on the image plane, it is inconvenient that a difference, in the optical axis direction, between the best imaging plane in the meridional direction and the best imaging plane in the sagittal direction tend to increase. In particular, at a peripheral portion on the image plane, lateral chromatic aberration and decentering coma aberration tend to severely increase. Therefore, it is undesirable. By the way, since the function of vibration reduction cannot be obtained unless the vibration reduction lens group G4v varies, the amount of $\Delta 4$ in conditional formula (1) must be positive. Therefore, the minimum value of conditional formula (1) is 0.

Furthermore, to more sufficiently perform the effect of the present invention, it is preferable in conditional formula (1) to set the upper limit value to 0.04.

Conditional formula (2) stipulates the condition for obtaining a sufficiently long back focal length so that the zoom lens of the present invention is practical for use with electronic imaging equipment. Also, to avoid shading in an optical system for electronic imaging equipment, the exit pupil must be sufficiently distant from the image plane. For this purpose as well, it is important to satisfy conditional formula (2).

When BFw/Y0 exceeds the upper limit value in conditional formula (2), the back focal length becomes too long, and the overall length of the zoom lens increases. This invites an increase in the size of the zoom lens. In addition the lens diameter of the fifth lens group G5 becomes excessively large.

On the other hand, when BFw/Y0 falls below the lower limit value in conditional formula (2), the back focal length becomes too short, and it becomes difficult to maintain sufficient space to accommodate filters and prisms in the optical path between the most image side lens in the zoom lens and the image pickup device, such as a CCD. In addition, the above-mentioned shading is produced easily, since the position of the exit pupil approaches too close to the image plane.

Furthermore, to more sufficiently perform the effect of the present invention, it is preferable in conditional formula (2) to set the upper limit value to 5.0 and the lower limit value to 3.0.

Conditional formula (3) stipulates an appropriate range for the ratio of the difference of air gap along the optical axis (D23t−D23w) between the second lens group G2 and the third lens group G3 at the wide-angle end and telephoto end, respectively, to the focal length fw of the zoom lens at the wide-angle end.

When (D23t−D23w)/fw exceeds the upper limit value in conditional Formula (3), the overall zoom lens length at the wide-angle end increase excessively, inviting an increase in the front lens group diameter (i.e., the lens diameter of the first lens group G1)). Also, the field curvature in both the wide-angle end and the telephoto end shifts greatly toward the negative side. Also, spherical aberration at the telephoto end cannot be sufficiently corrected. In addition, when zooming, it becomes difficult to ensure a sufficient space for a movement along the optical axis for the second lens group G2, and to ensure a large change in the working magnification of the third lens group G3. Further, it becomes difficult to increase magnification.

When (D23t−D23w)/fw falls below the lower limit value in conditional formula (3), it becomes difficult to increase the zoom ratio and to equalize the aberration correction burden of each lens group when zooming. Also, the generation and fluctuation of various aberrations when zooming increases excessively. In particular, the fluctuation in field curvature and coma when zooming increases, and the field curvature at the telephoto end increases excessively toward the negative side. In addition, excessively large positive coma is generated with respect to the rays below the principle ray at the wide-angle end. Similarly, excessively large positive coma is generated with respect to the rays above the principle ray at the telephoto end. As a result, satisfactory imaging performance can no longer be obtained.

Furthermore, to more sufficiently perform the effect of the present invention, it is preferable in conditional formula (3) to set the upper limit value to 1.0 and the lower limit value to 0.2.

The relative positional relationship of the second lens group G2 and the third lens group G3 with respect to the first lens group G1 in the intermediate focal length state is also important. In the zoom lens of the present invention, it was found that the fluctuation of aberration when zooming could be controlled and satisfactory imaging performance could be achieved by appropriately setting the above-mentioned relative positional relationship, as explained immediately below.

The movement locus (i.e., trajectory) of the third lens group G3 when zooming will first be explained with regard to the fluctuation of aberration when zooming. If the movement locals of the third lens group G3 when zooming is made nonlinear of which figure is convex to the object side, spherical aberration can be shifted toward the negative (−) side if the rays from the axial object point passing through the second lens group G2 in the intermediate focal length state diverge. Also spherical aberration can be shifted toward the positive (+) side if the rays from the axial object point converge. In addition, the field curvature can be corrected toward the positive (+) side.

Conversely, if the movement locus of the third lens group G3 when zooming is made nonlinear of which figure is concave to the object side, spherical aberration can be shifted toward the positive (+) side if the rays from the axial object point passing through the second lens group G2 in the intermediate focal length state diverge. Also, spherical aberration can be shifted toward the negative (−) side if the rays from the axial object point converge. In addition, the field curvature can be corrected toward the negative (−) side.

By utilizing the above-mentioned properties, the fluctuation of aberration that cannot be completely corrected by lens groups other than the second lens group G2 and the third lens group G3 can also be corrected. This point can be clearly seen in the working examples set forth below. In case where there are sufficient degrees of freedom of aberration correction from lens groups other than the second lens group G2 and the third lens group G3, sufficient imaging performance can be obtained even if the movement loci of the second lens group G2 and the third lens group G3 are linear. Such cases are also included in the scope of the present invention. In this manner, it was found in the present invention that superior imaging performance can be achieved in the intermediate focal length state by changing the air gap along the optical between the second lens group G2 and the third lens group G3 in a manner that is either linear or non-linear.

In addition, when configuring an actual zoom lens, it is preferable to fix the first lens group G1 and the fourth lens group G4 when zooming. This configuration is mechanically simple, and reduces the effect of manufacturing errors. In particular, the steadiness and dustproofness of the lens barrel construction increases if the first lens group G1 is fixed.

In addition to the configuration mentioned above, in the zoom lens of the present invention, it is preferable to satisfy the following conditional formulae (4) and (5):

$$0.1 < f2/f3 < 2.0 \quad (4)$$

$$2.0 < |f3|/fw < 10.0 \quad (5)$$

where f2 denotes the focal length of the second lens group G2 and f3 denotes the focal length of the third lens group G3. Conditional formula (4) stipulates an appropriate range for the ratio of the focal length f2 of the second lens group G2 to the focal length f3 of the third lens group G3.

If f2/f3 exceeds the upper limit value in conditional formula (4), it is undesirable since the focal length f3 of the third lens group G3 decreases excessively, the fluctuation of coma when zooming increases, and distortion at the telephoto end shifts greatly toward the positive side. In addition, positive lower coma is generated at the wide-angle end, spherical aberration at the telephoto end is excessively corrected on the positive side, and satisfactory imaging performance can no longer be obtained.

On the other hand, if f2/f3 falls below the lower limit value in conditional formula (4), it is undesirable since the focal length f2 of the second lens group G2 decreases excessively, the fluctuation of coma when zooming increases, and distortion at the telephoto end shifts greatly toward the negative side. In addition, negative lower coma is generated at the wide-angle end, spherical aberration at the telephoto end is excessively corrected on the negative side, and satisfactory imaging performance can no longer be obtained.

To more sufficiently perform the effect of the present invention, it is preferable in conditional formula (4) to set the upper limit value to 0.5 and the lower limit value to 0.15.

Conditional formula (5) stipulates appropriate range for the ratio between the focal length f3 of the third lens group G3 and the focal length fw of the zoom lens at the wide-angle end. If |f3|/fw exceeds the upper limit value in conditional formula (5), the focal length f3 of the third lens group G3 increases excessively. If the construction of the lens groups which are arranged beyond the lens group G3 is identical, then the overall length of the zoom lens at the wide-angle end increases, lower coma at the wide-angle end increases excessively toward the positive side. Thereby, it is undesirable that the Petzval sum tends toward the negative side.

Conversely, if |f3|/fw falls below the lower limit value in conditional formula (5), the focal length f3 of the third lens group G3 decreases excessively. If the construction of the lens groups which are arranged beyond the lens group G3 is identical, then it becomes difficult to ensure an adequately long back focal length at the wide-angle end, and the fluctuation of field curvature when zooming increases.

To more sufficiently perform the effect of the present invention, it is preferable in conditional formula (5) to set the upper limit value to 7.0 and the lower limit value to 4.0.

Further, in the present invention, it is preferable to satisfy the following conditional formula (6):

$$0.001 < \Delta 4/\Phi 4 < 0.2 \qquad (6)$$

where the reference symbol $\Phi 4$ represents the diameter of the effective aperture at the most object side of the fourth lens group G4 and the reference symbol $\Delta 4$ represents a maximum displacement amount of the vibration reduction lens group G4v in the direction substantially perpendicular to the optical axis while attaining vibration reduction.

Conditional formula (6) stipulates an appropriate range in association with the ratio of the maximum displacement amount of the vibration reduction lens group G4v to the effective aperture of the fourth lens group G4.

When the ratio exceeds the upper limit value of conditional formula (6), the maximum displacement amount $\Delta 4$ becomes too large with respect to the effective aperture $\Phi 4$, and stray light tends to be mixed(entered) upon vibration reduction. It is not desirable that particularly spherical aberration, among various aberrations, increases excessively at the telephoto end.

On the other hand, when the ratio falls below the lower limit value of conditional formula (6), the amount of the maximum displacement $\Delta 4$ becomes too small with respect to the effective aperture $\Phi 4$, and thereby, the effect of vibration reduction becomes too small. If the focal length of the vibration reduction lens group G4v is made longer (larger) in order to avoid aforementioned defect, it tends lo lose aberration balance of whole lens system, and total lens length also becomes too long.

To more sufficiently perform the effect of the present invention, it is preferable in conditional formula (6) to set the upper limit value to 0.1 and the lower limit value to 0.0025.

Further, in the present invention, it is preferable to satisfy the following conditional formula (7):

$$0.3 < D23m/fw < 3.0 \qquad (7)$$

wherein D23m is the air gap along the optical axis between the second lens group G2 and the third lens group G3 in the intermediate focal length state. Furthermore, the intermediate focal length state in D23m corresponds to a state where twice the focal length fw (i.e., 2×fw) of the zoom lens at the wide-angle end if the zoom lens is set at infinite focus. In addition, the intermediate focal length state corresponds to a state where twice the magnification βw (i.e., 2×βw) of the zoom lens at the wide-angel end ii the zoom lens is set at short-distance focus.

Conditional formula (7) stipulates an appropriate range for the ratio of the air gap along the optical axis D23m between the second lens group G2 and the third lens group G3 in the intermediate focal length state to the focal length fw of the zoom lens at the wide-angle end.

When D23m/fw exceeds the upper limit in conditional formula (7), it is undesirable, since the fluctuation of coma in the intermediate focal length state and the fluctuation of astigmatism increase. In addition, the overall length of the zoom lens in the intermediate focal length state increases, and the mechanical configuration becomes complex:.

On the other hand, when D23m/fw falls below the lower limit of conditional formula (7), it is undesirable, since the image plane tends to be displaced toward the negative side, and the fluctuation of coma of the rays below the principle ray increases. In addition, due to the tendency of the principle ray to pass through the periphery of the first lens group G1, the quantity of light passing through the zoom lens decreases markedly. Also, high-order positive distortion is generated.

In addition, in the zoom lens of the present invention, it was found that, if the field angle at the wide-angle end is greater than 50 degree, solving the trajectory while. satisfying conditional formula (7) is particularly effective in ensuring a peripheral quantity of light while in the intermediate focal length state.

Furthermore, to more sufficiently perform the effect of the present invention, it is preferable in conditional formula (7) to set the upper limit value to 2.0 and the lower limit value to 0.65.

Further, in the present invention, it is preferable to satisfy the following conditional formulae (8) and (9):

$$0.5 < |f23w|/fw < 2.0 \qquad (8)$$

$$0.3 < D23t/fw < 1.5 \qquad (9)$$

wherein the reference symbol f23w represents the composite focal Length of the second lens group G2 and the third lens group G3 at the wide-angle end. Conditional formula (8) stipulates an appropriate range for the ratio of composite focal length f23w of the second lens group G2 and the third lens group G3 at the wide-angle end, to the focal length fw of the zoom lens at the wide-angle end.

When $|f23w|/fw$ exceeds the upper limit value in conditional formula (8), the fluctuation of coma and the fluctuation of astigmatism increase when zooming. If the fourth lens group G4 and those beyond are identical, it is undesirable that it becomes difficult to ensure an adequately long lack focal length at the wide-angle end.

Conversely, if $|f23w|/fw$ falls below the lower limit value of conditional formula (8), it is undesirable since, if the fourth lens group G4 and those beyond are identical, then not only does the overall length of the zoom lens at the wide-angle end increases, but the lens diameters of the fourth lens group G4 and those lens groups beyond G4 increase, which prevents increased compactness.

To more sufficiently perform the effect of the present invention, it is preferable in conditional formula (8) to set the upper limit value to 1.5 and the lower limit value to 0.8.

Conditional formula (9) stipulates an appropriate range for the ratio of the air gap D23t along the optical axis between the second lens group G2 and the third lens group G3 at the telephoto end to the focal length of the zoom lens at the wide-angle end.

When D23t/fw exceeds the upper limit value of conditional formula (9), it is undesirable since spherical aberration at the telephoto end tends to increase excessively. In addition, if the first lens group G1 and the fourth lens group G4 are fixed when zooming, it becomes difficult to ensure an increased zoom ratio.

Conversely, when D23t/fw falls below the lower limit value of conditional formula (9), it is undesirable since the field curvature shifts toward the negative side. In addition, coma of the rays below the principle ray increases.

To more sufficiently perform the effect of the present invention, it is preferable in conditional formula (9) to set the upper limit value to 1.2 and the lower limit value to 0.8.

Further, in the present invention, it is preferable that the fourth lens group G4 include a positive lens L4p arranged at the most object side and negative lens L4n arranged at the most image side. Further, it is preferable that the fifth lens group G5 includes a cemented lens having a divergent convex cemented surface facing image side. Also, it is preferred that the following conditional formula (10) is satisfied:

$$0.18 < \Delta N \tag{10}$$

wherein $\Delta N$ is the mean value of a difference of a refractive index for d-line between the positive lens L4p and the negative lens L4n of the fourth lens group G4, and a difference of a refractive index for d-line between the object side lens and the image side lens that interpose the cemented surface in the fifth lens group G5.

For a zoom lens having a long back focal length compared with the maximum image height, axial rays passing through the most image side lens group tend to travel therethrough far from the optical axis (i.e., the ray height is large), making correction of aberration of these axial rays difficult. In the zoom lens of the present invention, as described in conditional formula (10), it was found that aberrations associated with the above-mentioned axial rays could be satisfactorily corrected by setting the value of $\Delta N$ to an appropriate range. It is also preferable that, in the fourth lens group G4, the refractive index of the positive lens L4p is lower than the refractive index of the negative lens L4n.

When $\Delta N$ falls below the lower limit value in conditional formula (10), correction of spherical aberration becomes difficult, and satisfactory imaging performance can no longer be obtained. Furthermore, the Petzval sum tends to shift toward the negative side.

When configuring the actual zoom lens, it is preferable to further satisfy certain structural requirements discussed below. A focusing operation to an object at a short-distance may be performed by so-called front focusing system, wherein the first lens group G1 is moved along the optical axis to the object side. However, it is important to ensure a sufficient peripheral quantity of light without the principal ray dropping down when focusing. Thus, a so-called rear focusing system is preferable, where focusing is performed by axially moving fifth lens group G5 along the optical axis.

In order to satisfactory correct chromatic aberration, it is preferable that the first lens group G1 include at least one cemented lens having positive refractive power. In addition, it is preferable that a negative lens, whose convex surface faces object side, is arranged most object side in the first lens group G1.

From the viewpoint of correcting aberration, it is preferable that: the second lens group G2 comprises a negative meniscus lens whose convex surface faces object side. Furthermore, to achieve an even higher degree of imaging performance, it is preferable that the second lens group G2 comprises a negative lens having at least one a spherical surface in order to obtain superior imaging performance. Furthermore, when zooming operation is performed from the wide-angle end to the telephoto end, it is preferable that the working magnification of the second lens group G2 change and pass through unity magnification (−1 magnification).

To satisfactorily correct chromatic aberration, it is preferable that at lease one of the second lens group G2 and the third lens group G3 have a cemented lens having negative refractive power. Further, it is preferable that the difference of the Abbe numbers of the lenses comprising the cemented lens is 10 or greater.

Furthermore, it is preferable that the working magnification of the third lens group G3 is a positive value over the entire zooming range.

As discussed above, it is preferable that the fourth lens group G4 is fixed when zooming, since this simplifies the mechanical configuration. Since the fourth lens group G4 is effective in the correction of spherical aberration, in corder to minimize the fluctuation of aberrations upon vibration reduction, it is preferable in the fourth lens group G4 that a biconvex lens is arranged most object side and a negative lens is arranged most image side. It may also be preferred that the biconvex lens and the negative lens are combined in a cemented lens, since chromatic aberration is satisfactorily corrected and the effect of manufacturing errors can be reduced. Also, by introducing an aspherical surface in the positive lens arranged most object side in the fourth lens group G4, image brightness can be increased.

In the present invention, in order to maintain good ability for vibration reduction, it is preferable to satisfy the following conditional formula (11):

$$0.00001 < PTZ \cdot \Delta 4/f4 < 0.0001 \tag{11}$$

wherein the reference symbol PZT denotes Petzval sum of the vibration reduction lens group G4v and the reference symbol f4 denotes focal length of the fourth lens group G4. As described above, the reference symbol $\Delta 4$ denotes a maximum displacement amount of the vibration reduction lens group G4v in the direction substantially perpendicular to the optical axis upon vibration reduction.

In order to maintain flatness of image field upon vibration reduction, it is desirable to satisfy conditional formula (11).

Also, to satisfactorily correct chromatic aberration, it is preferable that the fifth lens group G5 have at least one cemented lens having positive refractive power. Furthermore, it is preferable that the cemented lens has a divergent convex cemented surface facing image side.

Furthermore, it is preferable that biconvex lens is arranged at the most object side in the fifth lens group G5. In addition, by using aspherical surface in the biconvex lens, an even higher degree of imaging performance can be achieved.

Furthermore, it will be appreciated by one skilled in the art of lens design that use of aspherical lenses, gradient-index lenses, and diffractive elements and the like, is effective in further increasing imaging performance of the zoom lens of the present invention.

WORKING EXAMPLES

Working examples according to the present invention are described below with the help of attached drawings. Zoom lenses of working example of the present invention comprise, in order from object side, a first lens group G1 having positive refractive power, a second lens group G2 having negative refractive power, a third lens group G3 having negative refractive power, a fourth lens group G4 having positive refractive power, and a fifth lens group G5 having positive refractive power. Furthermore, when zooming from the wide-angle end to the telephoto end, the second lens group G2, the third lens group G3, and the fifth lens group G5 move along the optical axis so that the air gap between the first lens group G1 and the second lens group G2 increases, the air gap between the second lens group G2 and the third lens group G3 changes linearly or non-linearly, and the air gap between the fourth lens group G4 and the fifth lens group G5 changes linearly or non-linearly. The first lens group G1 and the fourth lens group G4 are fixed when zooming. When vibration reduction is attained, a vibration reduction lens group G4v consisting of the fourth lens group G4 or a partial lens group in the fourth lens group shifts in a direction substantially perpendicular to the optical axis.

In each working example, an aspherical surface is expressed as:

$$S(y)+(y^2/r)/\{1+(1-\kappa \cdot y^2/r^2)^{1/2}\}+C_4 \cdot y^4+C_6 \cdot y^6+C_8 \cdot y^8+C_{10} \cdot y^{10}+ \quad (a)$$

wherein y is the height in the direction perpendicular to optical axis, S(y) is the amount of deflection (amount of sag) between tangent plane to a vertex of each aspherical surface and each aspherical surface of height y in the direction of optical axis, r is the standard(base) radius of curvature (vertex radius of curvature), κ is the conical coefficient, and $C_n$ is the nth-order aspherical surface coefficient. Aspherical surface is denoted by adding a mark "*" to the right side of the surface number in each embodiments.

(Working Example 1)

Figure 1B:
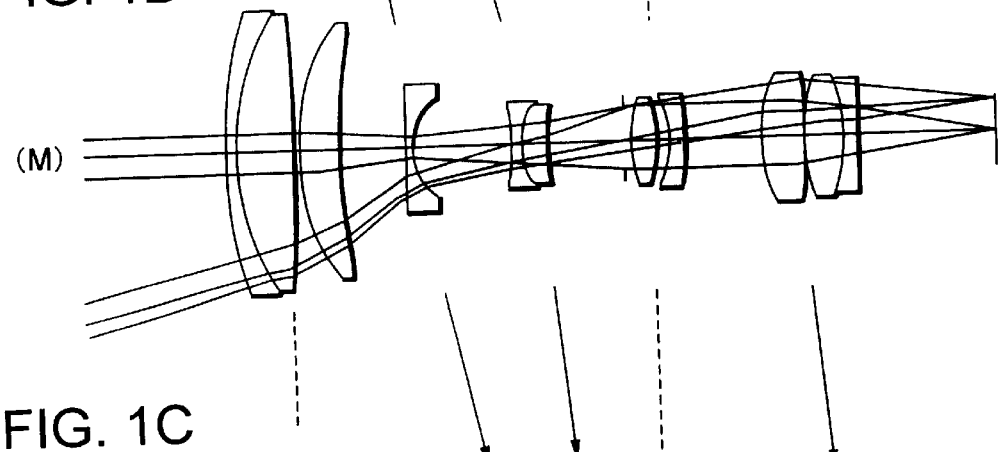
Figure 1C:
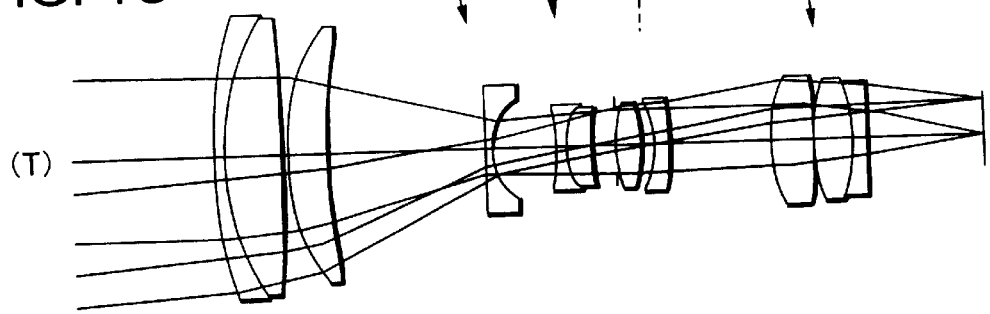

FIGS. 1A to 1C shows construction of a zoom lens according to a Working Example 1 of the present invention, and shows trajectory of each lens group when the focal length of the zoom lens changes from the wide-angle end(W) to the telephoto end(T) by way of the intermediate state(M). Working Example 1 is suitable for use with electronic imaging equipment requiring a zoom lens set at infinite focus. A first lens group G1 comprises, in order from object side, a cemented positive lens comprising a negative meniscus lens having a convex surface facing to the object side and a double convex lens, and a positive meniscus lens having a convex surface facing to the object. A second lens group G2 comprises a double concave lens having an aspherical surface facing to the object. A third lens group G3 comprises, in order from object side, a cemented negative lens comprising a double concave lens and a positive meniscus lens having a convex surface facing to the object side. A fourth lens group G4 comprises, in order from object side, a double convex lens and a negative meniscus lens having a concave surface facing to, the object side. A fifth lens group G5 comprises, in order from object side, a double convex lens having an aspherical surface facing to the image side and a cemented positive lens comprising a double convex lens and a negative meniscus lens having a concave surface facing to the object side.

When zooming, the second lens group G2, the third lens group G3, and the fifth lens group G5 move along the trajectories shown by the arrows in FIGS. 1A to 1C. The first lens group G1 and the fourth lens group G4 are fixed. In addition, an aperture diaphragm S is arranged in the vicinity of the fourth lens group G4 between the third lens group G3 and the fourth lens group G4. The aperture diaphragm S is fixed when zooming, as well as the fourth lens group G4.

When vibration reduction is attained, a vibration reduction lens group G4v consisting of the fourth lens group G4 shifts in a direction substantially perpendicular to the optical axis, thereby correcting an image fluctuation caused by a camera shake.

The following Table 1 shows the specification values of Working Example 1 of the present invention. In Table 1, the reference symbol f denotes the focal length of the entire zoom lens, FNO denotes f-number, Bf denotes the back focal length, and D0 denotes a distance along the optical axis between an object and the surface of the optical system which is closest to the object. The reference symbol SNO denotes the lens surface number in order from the object side (i.e., along the direction in which the light rays travel), D denotes the interval(air gap) between the surfaces, and n(d) and n(g) denote the refractive index with respect to the d-line (λ=587.6 nm) and g-line (λ=435.8 nm), respectively. The reference symbol R denotes the radius of curvature, and when a surface is aspherical surface, R denotes the vertex radius of curvature.

Regarding vibration reduction data in Table 1, the reference symbols ΔW, ΔM, and ΔT denote maximum displacement amounts Δ4 of the vibration reduction lens group G4v at the wide-angle end, in the medium focal length state, and at the telephoto end, respectively. When the sign ofΔ4 is same as that of ΔW, ΔM, or ΔT, the displacement direction of the vibration reduction lens group G4v is same as the moving direction of the image. Conversely, when the sign ofΔ4 is different from that of ΔW, ΔM, or ΔT, the displacement direction of the vibration reduction lens group G4v is opposite to the moving direction of the image.

Further, in Table 1, the reference symbol fm denotes the focal length cf the zoom lens in the intermediate focal length state.

TABLE 1

|  | Wide-angle end | Intermediate | Telephoto end | |
|---|---|---|---|---|
| f | 7.85 | 15.7 | 62.8 | |
| FNO | 2.82 | 2.89 | 2.82 | |
| SNO | R | D | n(d) | n(g) |
| 1 | 72.4877 | 1.5000 | 1.860741 | 1.910649 |
| 2 | 37.9615 | 8.0000 | 1.603001 | 1.614372 |
| 3 | −235.8323 | 0.5000 | | |
| 4 | 30.5625 | 5.7452 | 1.696800 | 1.712319 |
| 5 | 88.5963 | d5 (variable) | | |
| 6* | −87.2833 | 1.2000 | 1.589130 | 1.601033 |
| 7 | 8.9513 | d7 (variable) | | |
| 8 | −24.2898 | 1.5000 | 1.723421 | 1.748045 |
| 9 | 10.0575 | 3.4086 | 1.860741 | 1.910649 |
| 10 | 70.4631 | d10 (variable) | | |
| 11 | S | 1.0000 | | |
| 12 | 18.3247 | 3.1652 | 1.516800 | 1.526703 |
| 13 | −21.1803 | 2.0000 | | |
| 14 | −14.7684 | 2.0000 | 1.723421 | 1.748045 |
| 15 | −34.2152 | d15 (variable) | | |
| 16 | 21.2261 | 5.9965 | 1.516800 | 1.526703 |
| 17* | −59.9723 | 0.1042 | | |
| 18 | 25.1830 | 4.9944 | 1.516800 | 1.526703 |
| 19 | −18.9683 | 2.5000 | 1.860741 | 1.910649 |
| 20 | −136.6006 | (Bf) | | |

Aspheric Surface Data

| SNO | r | κ | $C_4$ |
|---|---|---|---|
| 6 | −87.2833 | 1.0000 | $3.32490 \times 10^{-5}$ |
| | $C_6$ | $C_8$ | $C_{10}$ |
| | $2.75250 \times 10^{-8}$ | $-1.23170 \times 10^{-9}$ | $3.22980 \times 10^{-12}$ |
| SNO | r | κ | $C_4$ |
| 17 | −59.9723 | 1.0000 | $2.97470 \times 10^{-5}$ |
| | $C_6$ | $C_8$ | $C_{10}$ |
| | $-7.27790 \times 10^{-8}$ | $-7.61270 \times 10^{-11}$ | $5.31720 \times 10^{-12}$ |

Variable Interval When Zooming

|  | Wide-angle end | Intermediate | Telephoto end |
|---|---|---|---|
| f | 7.85 | 15.7 | 62.8 |
| D0 | ∞ | ∞ | ∞ |
| d5 | 1.0 | 9.92095 | 22.90002 |
| d7 | 6.5 | 14.0 | 8.60227 |
| d10 | 27.0 | 10.57905 | 2.99771 |
| d15 | 17.04789 | 11.56013 | 14.20316 |
| Bf | 13.41951 | 18.90563 | 16.26425 |

Vibration Reduction Data

| Δ4 | ΔW | ΔM | ΔT |
|---|---|---|---|
| 0.1 | 0.06635 | 0.06770 | 0.06619 |

Design Condition Value

BFw=13.420
Y=4.0
D23t=8.60227
D23w=6.50000
D23m=14.00000
Φ4=9.61
fw=7.850
ft=62.800
fm=15.7
f2=−13.717
f3=−34.891
f4=36.277
f4V=36.277
f23w=−8.561
ΔN=0.27528
PTZ=0.01853
(1) Δ4 /|f4V|=0.00276
(2) BFw/Y=3.3550
(3) (D23t−D23w)/fw=0.2678
(4) f2/f3=0.3931
(5) |f3|/fw=4.4450
(6) Δ4/Φ4=0.0104
(7) D23m/fw=1.78571
(8) |f23w|/fw=1.0906
(9) D23t/fw=1.0958
(10) ΔN=0.27528
(11) PTZ·Δ4/f4=0.0000511

FIGS. 2A through 4F are graphs showing aberrations for Working Example 1 with respect to the d-line (λ=587.6 nm) and g-line (λ=435.8 nm). FIGS. 2A through 2F are graphs showing aberrations at the wide-angle end focused on an infinite object. FIGS. 3A through 3F are graphs showing aberrations in the intermediate state focused on an infinite object. FIGS. 4A through 4F are graphs showing aberrations at the telephoto end focused on an infinite object.

In each graph, FNO denotes f-number, Y denotes image height, d denotes d-line (λ=587.6 nm), and g denotes g-line (λ=435.8 nm). In the graphs showing the astigmatism, a solid curve represents the sagittal image plane, and a broken curve represents the meridional image plane.

As can be seen from these graphs, according to Working Examples 1, the aberrations are satisfactorily corrected at each focal length from the wide-angle end to the telephoto end even under vibration reduction.

(Working Example 2)

Figure 5A:
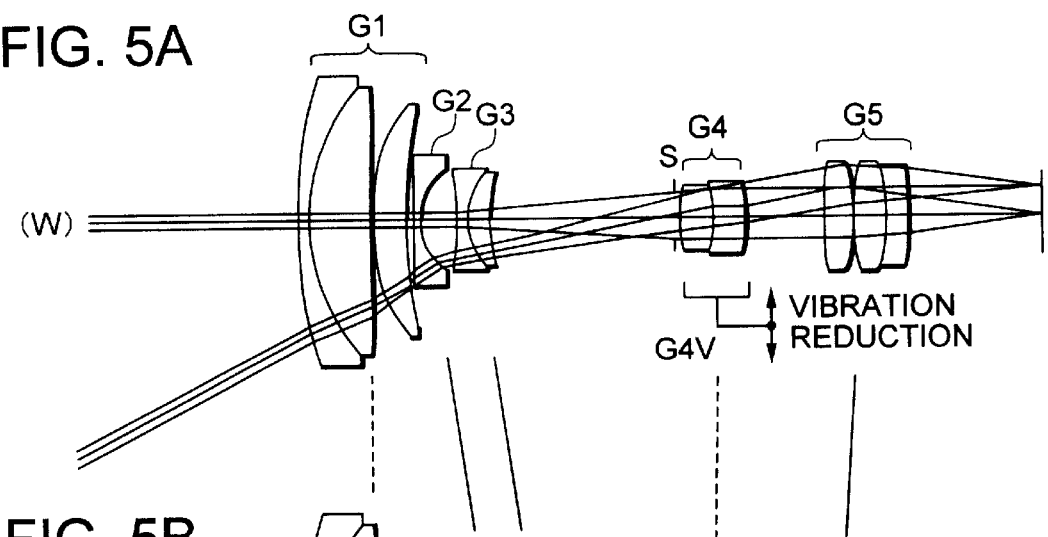
FIGS. 5A to 5C shows a construction of a zoom lens according to a Working Example 2 of the present invention, and shows trajectory of each lens group when the focal length of the zoom lens changes from the wide-angle end (W) to the telephoto end(T) by way of the intermediate state(M).
Figure 5B:
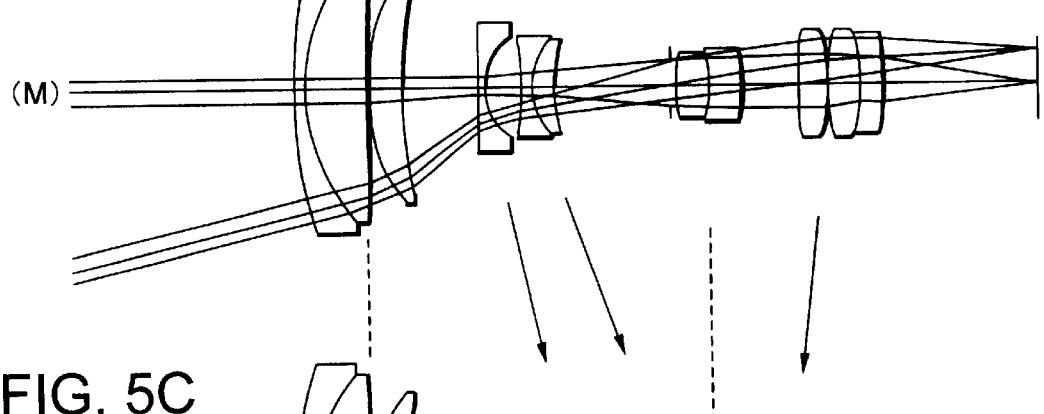
Figure 5C:
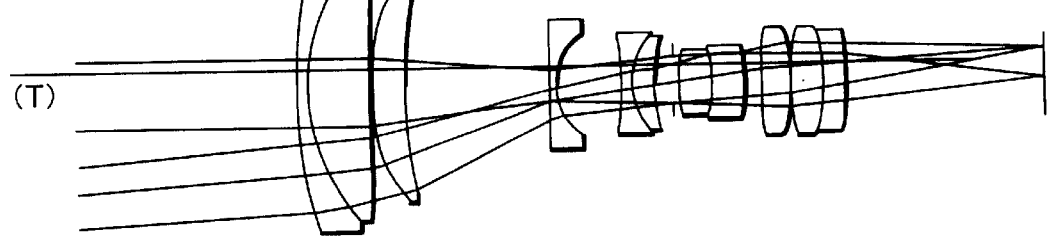

FIGS. 5A to 5C shows construction of a zoom lens according to a Working Example 2 of the present invention, and shows trajectory of each lens group when the focal length of the zoom lens changes from the wide-angle (W) end to the telephoto end (T) by way of the intermediate state (M). Working Example 2 is suitable for use with electronic imaging equipment requiring a zoom lens set at finite focus.

The zoom lens showing in FIGS. 5A to 5C is constituted by, in the following order from the object side: A first lens group G1 comprises, in order from the object side, a cemented positive lens comprising a negative meniscus lens having a convex surface facing to the object and a double convex lens, and a positive meniscus lens having a convex surface facing to the object side; A second lens group G2 comprises a negative meniscus lens having a convex surface facing to the object side; A third lens group G3 comprises, in order from object side, a cemented negative lens comprising a double concave lens and a positive meniscus lens having a convex surface facing to the object side; A fourth lens group G4 comprises, in order from object side, a cemented positive lens comprising a double convex lens and a negative meniscus lens having a concave surface facing to the object side; A fifth lens group comprises, in order from object side, a double convex lens and a cemented positive lens comprising a double convex lens and a negative meniscus lens having a concave surface facing to the object side.

When zooming, the second lens group G2, the third lens group G3, and the fifth lens group G5 move along the trajectories shown by the arrow in FIGS. 5A to 5C. The first lens group G1 and the fourth lens group G4 are fixed. In addition, an aperture diaphragm S is arranged in the vicinity of the fourth lens group G4 between the third lens group G3 and. the fourth lens group G4. The aperture diaphragm S is fixed when zooming, as well as the fourth lens group G4.

When vibration reduction is attained, a vibration reduction lens group G4v consisting of the fourth lens group G4 shifts in a direction substantially perpendicular to the optical axis, thereby correcting an image fluctuation caused by a camera shake.

The following Table 2 shows the specification values of Working Example 2 of the present invention. In Table 2, the reference symbol β denotes the photographing magnification, NA denotes the numerical aperture, Bf denotes the back focal length, and D0 denotes a distance along the optical axis between an object and the surface of the optical system which is closest to the object. The reference symbol SNO denotes the lens surface number in order from the object side (i.e., along the direction in which the light rays travel), D denotes the interval between the surfaces, and n(d) and n(g) denote the refractive index with respect to the d-line (λ=587.6 nm) and g-line (λ=435.8 nm), respectively. The reference symbol R denotes the radius of curvature, and when a surface is aspherical surface, R denotes the vertex radius of curvature.

Regarding vibration reduction data in Table 2, the reference symbols ΔW, ΔM, and ΔT denote maximum displacement amounts Δ4 of the vibration reduction lens group G4v at the wide-angle end, in the intermediate focal length state, and at the telephoto end, respectively. When the sign of Δ4 is same as that of ΔW, ΔM, or ΔT, the displacement direction of the vibration reduction lens group G4v is same as the moving direction of the image. Conversely, when the sign of Δ4 is different from that of ΔW,ΔM, or ΔT, the displacement direction of the vibration reduction lens group G4v is opposite to the moving direction of the image.

Further, in Table 2, the reference symbol βw, βm, and βt denote the photographing magnification at the wide-angle end, in the intermediate focal length state, and at the telephoto end, respectively.

TABLE 2

|  | Wide-angle end | Intermediate | Telephoto end |  |
|---|---|---|---|---|
| β = | −0.01652 | −0.03304 | −0.09900 |  |
| NA = | 0.14 | 0.14 | 0.12 |  |
| SNO | R | D | n(d) | n(g) |
| 1 | 67.0367 | 1.6000 | 1.784700 | 1.824660 |
| 2 | 31.1162 | 8.6000 | 1.620410 | 1.633120 |

TABLE 2-continued

| | | | | |
|---|---|---|---|---|
| 3 | −355.6780 | 0.1000 | | |
| 4 | 29.5164 | 5.0000 | 1.696800 | 1.712350 |
| 5 | 85.5580 | d5 (variable) | | |
| 6 | 135.5811 | 1.2000 | 1.834000 | 1.862680 |
| 7 | 9.5568 | d7 (variable) | | |
| 8 | −58.2538 | 1.5000 | 1.589130 | 1.601000 |
| 9 | 9.2694 | 3.5000 | 1.846660 | 1.893900 |
| 10 | 22.5681 | d10 (variable) | | |
| 11 | S | 1.2000 | | |
| 12 | 23.8130 | 4.6000 | 1.516800 | 1.526670 |
| 13 | −8.6049 | 4.0000 | 1.603110 | 1.615400 |
| 14 | −57.9764 | d14 (variable) | | |
| 15 | 197.5827 | 4.0000 | 1.516800 | 1.526670 |
| 16 | −21.3351 | 0.1000 | | |
| 17 | 26.7109 | 5.0000 | 1.497000 | 1.504510 |
| 18 | −15.0196 | 2.5000 | 1.805180 | 1.847010 |
| 19 | −48.0019 | (Bf) | | |

Variable Interval When Zooming

| | Wide-angle end | Intermediate | Telephoto end |
|---|---|---|---|
| β | −0.01652 | −0.03304 | −0.09900 |
| D0 | 455.0 | 455.0 | 455.0 |
| d5 | 1.14512 | 11.31376 | 21.08048 |
| d7 | 4.94778 | 5.37363 | 9.23430 |
| d10 | 26.70500 | 16.11051 | 2.48312 |
| d14 | 12.03693 | 8.82229 | 3.17471 |
| Bf | 19.41829 | 22.63293 | 28.28051 |

Vibration Reduction Data

| Δ4 | ΔW | ΔM | ΔT |
|---|---|---|---|
| 0.1 | 0.05261 | 0.05496 | 0.06358 |

Design Condition Value

BFw=19.418
Y0=4.25
D23t=9.23430
D23w=4.94778
D23m=5.37363
Φ4=7.07
fw=7.999
ft=57.327
βw=−0.01652
βt=−0.099
βm=−0.03304
f2=−12.382
f3=−53.579
f4=46.019
f4V=46.019
f23w=−8.838
ΔN=0.197245
PTZ=0.01667
(1) Δ4/|f4V|=0.00217
(2) BFw/Y0=4.5689
(3) (D23t−D23w)/fw=0.5309
(4) f2/f3=0.2311
(5) |f3|/fw=6.6982
(6) Δ4/Φ4=0.0141
(7) D23m/fw=0.67179
(8) |f23w|/fw=1.1049
(9) D23t/fw=1.1544
(10) ΔN=0.19725
(11) PTZ·Δ4f4=0.0000362

FIGS. 6A through 8F are graphs showing aberrations for Working Example 2 with respect to the d-line (λ=587.6 nm) and g-line (λ=435.8 nm). FIGS. 6A through 6F are graphs showing aberrations at the wide-angle end focused on a finite object. FIGS. 7A through 7F are graphs showing aberrations in the intermediate state focused on a finite object. FIGS. 8A through 8F are graphs showing aberrations at the telephoto end focused on a finite object.

In each graph, NA denotes the numerical aperture, Y denotes image height, d denotes d-line (λ=587.6 nm), and g denotes g-line (λ=435.8 nm). In the graphs showing the astigmatism, a solid curve represents the sagittal image plane, and a broken curve represents the meridional image plane.

As can be seen from these graphs, according to Working Example 2, the aberrations are satisfactorily corrected at each focal length from the wide-angle end to the telephoto end even under vibration reduction.

(Working Example 3)

Figure 9A:
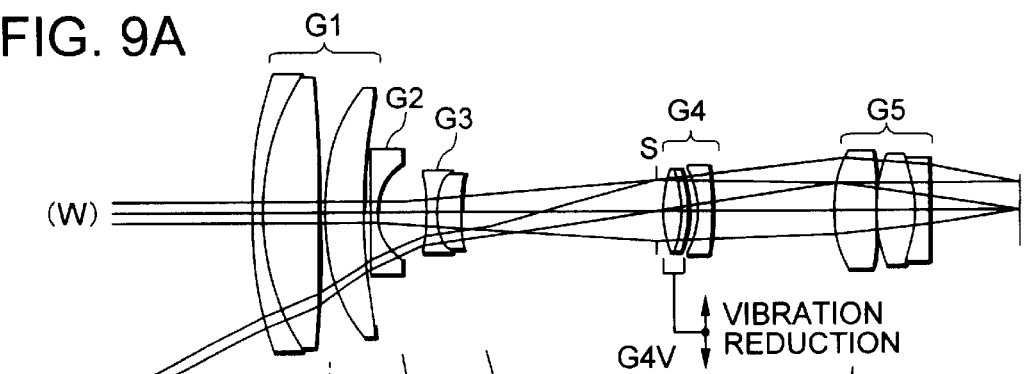
FIGS. 9A to 9C shows a construction of a zoom lens according to a Working Example 3 of the present invention, and shows trajectory of each lens group when the focal length of the zoom lens changes from the wide-angle end (W) to the telephoto end (T) by way of the intermediate state (M).
Figure 9B:
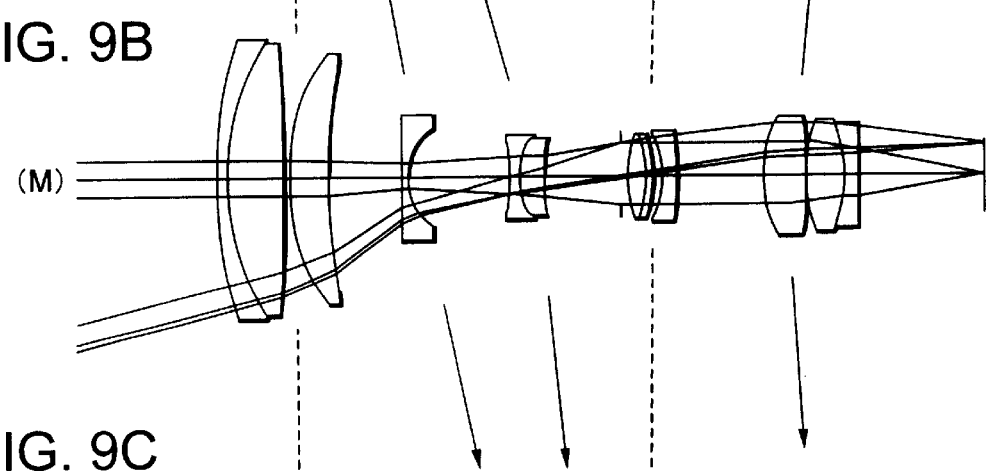
Figure 9C:
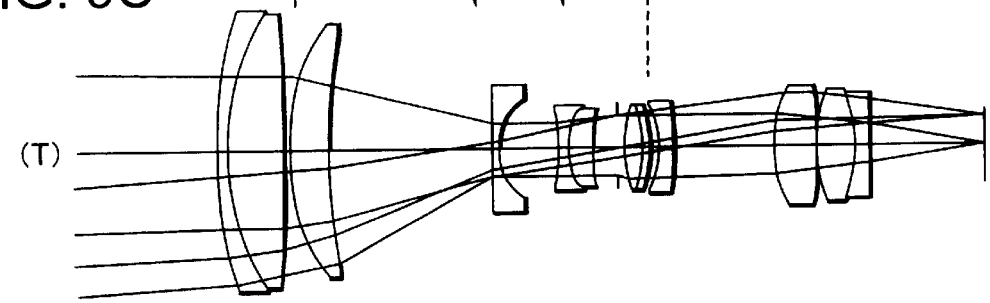

FIGS. 9A to 9C shows construction of a zoom lens according to a Working Example 3 of the present invention, and shows trajectory of each lens group when the focal length of the zoom lens changes from the wide-angle end (W) to the telephoto end (T) by way of the intermediate state(M). Working Example 3, same as Working Example 1, is suitable for use with electronic imaging equipment requiring a zoom lens set at infinite focus.

The zoom lens showing in FIGS. 9A to 9C is constituted by, in the following order. A first lens group G1 comprises, in order from the object side, a cemented positive lens comprising a negative meniscus lens having a convex surface facing to the object and a double convex lens, and a positive meniscus lens having a convex surface facing to the object side. A second lens group G2 comprises a double concave lens having an aspherical surface facing t:o the object side.

A third lens group G3 comprises, in order from object side, a cemented :negative lens comprising a double concave lens and a positive meniscus lens having a convex surface facing to the object side. A fourth lens group G4 comprises, in order from object side, a cemented positive lens comprising a double convex lens and a negative meniscus lens having a concave surface facing to the object side and a negative meniscus lens having a concave surface facing to the object side.

A fifth lens group comprises, in order from object side, a double convex lens having an aspherical surface facing to the image side and a cemented positive lens comprising a double convex lens and a negative meniscus lens having a concave surface facing to the object side.

When zooming, the second lens group G2, the third lens group G3, and the fifth lens group G5 move along the trajectories shown by the arrow in FIGS. 9A to 9C. The first lens group G1 and the fourth lens group G4 are fixed. In addition, an aperture diaphragm S is arranged in the vicinity of the fourth lens group G4 between the third lens group G3 anl the fourth lens group G4. The aperture diaphragm S is flexed when zooming, as well as the fourth lens group G4.

When vibration reduction is attained, a vibration reduction lens group G4v consisting of a cemented positive lens, which is a portion of the fourth lens group G4, shifts in a direction substantially perpendicular to the optical axis, thereby correcting an image fluctuation caused by a camera shake.

The following Table 3 shows the specification values of Working Example 3 of the present invention. In Table 3, the reference symbol f denotes the focal length of the entire zoom lens, FNO denotes f-number, Bf denotes the back focal length, and D0 denotes a distance along the optical axis between an object and the surface of the optical system which is closest to the object. The reference symbol SNO denotes the lens surface number in order from the object side (i.e., along the direction in which the light rays travel), D denotes the interval between the surfaces, and n(d) and n(g) denote the refractive index with respect to the d-line ($\lambda$=587.6 nm) and g-line ($\lambda$=435.8 nm), respectively. The reference symbol R denotes the radius of curvature, and when a surface is aspherical surface, R denotes the vertex radius of curvature.

Regarding vibration reduction data in Table 3, the reference symbols $\Delta W$, $\Delta M$, and $\Delta T$ denote maximum displacement amounts $\Delta 4$ of the vibration reduction lens group G4v at the wide-angle end, in the intermediate focal length state, and at the telephoto end, respectively. When the sign of $\Delta 4$ is same as that of $\Delta W$, $\Delta M$, or $\Delta T$, the displacement direction of the vibration reduction lens group G4v is same as the moving direction of the image. Conversely, when the sign of $\Delta 4$ is different from that of $\Delta W$, $\Delta M$, or $\Delta T$, the displacement direction of the vibration reduction lens group G4v is opposite to the moving direction of the image.

Further, in Table 3, the reference symbol fm denotes the focal length of the zoom lens in the intermediate focal length state.

TABLE 3

|   | Wide-angle end | Intermediate | Telephoto end |
|---|---|---|---|
| f | 7.676 | 15.18 | 61.097 |
| FNO | 2.76 | 2.80 | 2.74 |

| SNO | R | D | n(d) | n(g) |
|---|---|---|---|---|
| 1 | 72.4877 | 1.5000 | 1.860741 | 1.910649 |
| 2 | 37.9615 | 8.0000 | 1.603001 | 1.614372 |
| 3 | −235.8323 | 0.5000 | | |
| 4 | 30.5625 | 5.7452 | 1.696800 | 1.712319 |
| 5 | 88.5963 | d5 (variable) | | |
| 6* | −87.2898 | 1.2000 | 1.589130 | 1.601033 |
| 7 | 8.9513 | d7 (variable) | | |
| 8 | −24.2898 | 1.5000 | 1.723421 | 1.748045 |
| 9 | 10.0575 | 3.4086 | 1.860741 | 1.910649 |
| 10 | 70.4631 | d10 (variable) | | |
| 11 | S | 1.0000 | | |
| 12 | 16.8060 | 3.0 | 1.516800 | 1.526703 |
| 13 | −11.4954 | 0.8 | 1.744000 | 1.764871 |
| 14 | −14.4175 | 1.2 | | |
| 15 | −13.1313 | 2.0 | 1.744000 | 1.764871 |
| 16 | −35.8019 | d16 (variable) | | |
| 17 | 20.6744 | 5.9965 | 1.516800 | 1.526703 |
| 18* | −86.3505 | 0.1042 | | |
| 19 | 23.9343 | 4.9944 | 1.516800 | 1.526703 |
| 20 | −17.3273 | 2.5 | 1.860741 | 1.910649 |
| 21 | 92.2689 | (Bf) | | |

Aspheric Surface Data

| SNO | r | κ | $C_4$ |
|---|---|---|---|
| 6 | −87.2898 | 1.0000 | $3.32490 \times 10^{-5}$ |

| $C_6$ | $C_8$ | $C_{10}$ |
|---|---|---|
| $2.75250 \times 10^{-8}$ | $-1.23170 \times 10^{-9}$ | $3.22980 \times 10^{-12}$ |

| SNO | r | κ | $C_4$ |
|---|---|---|---|
| 18 | −86.3605 | 1.0000 | $2.97470 \times 10^{-5}$ |

-continued

| $C_6$ | $C_8$ | $C_{10}$ |
|---|---|---|
| $-7.27790 \times 10^{-8}$ | $-7.61270 \times 10^{-11}$ | $5.31720 \times 10^{-12}$ |

Variable Interval When Zooming

|   | Wide-angle end | Intermediate | Telephoto end |
|---|---|---|---|
| f | 7.68 | 15.18 | 61.10 |
| D0 | ∞ | ∞ | ∞ |
| d5 | 1.0 | 9.92095 | 22.90002 |
| d7 | 6.5 | 14.0 | 8.60227 |
| d10 | 27.02591 | 10.60496 | 3.02362 |
| d16 | 16.98186 | 11.49410 | 14.13713 |
| Bf | 12.37145 | 17.58385 | 15.10390 |

Vibration Reduction Data

| $\Delta 4$ | $\Delta W$ | $\Delta M$ | $\Delta T$ |
|---|---|---|---|
| 0.05 | 0.07523 | 0.07769 | 0.07558 |

Design Condition Value

BFw=12.372
Y0=4.0
D23t=8.6,0227
D23w=6.50000
D23m=14.00000
$\Phi 4$=9.67
fw=7.676
ft=61.097
fm=15.18
f2=−13.717
f3=−34.891
f4=34.254
f4V=16.566
f23w=−8.561
$\Delta N$=0.28557
PTZ=0.04239
(1) $\Delta 4/|f4V|$=0.00302
(2) BFw/Y0=3.093
(3) (D23t−D23w)/fw=0.2739
(4) f2/f3=0.3931
(5) |f3|/fw=4.545
(6) $\Delta 4/\Phi 4$=0.00517
(7) D23m/fw=1.8239
(8) |f23w|/fw=1.115
(9) D23t/fw=1.1207
(10) $\Delta N$=0.28557
(11) PTZ·$\Delta 4$/f4=0.000619

FIGS. 10A through 12F are graphs showing aberrations for Working Example 3 with respect to the d-line ($\lambda$=587.6 nm) and g-line ($\lambda$=435.8 nm). FIGS. 10A through 10F are graphs showing aberrations at the wide-angle end focused on an infinite object. FIGS. 11A through 11F are graphs showing aberrations in the intermediate state focused on an infinite object. FIGS. 12A through 12F are graphs showing aberrations at the telephoto end focused on an infinite object.

In each graph, FNO denotes f-number, Y denotes image height, d denotes d-line ($\lambda$=587.6 nm), and g denotes g-line ($\lambda$=435.8 nm). In the graphs showing the astigmatism, a solid curve represents the sagittal image plane, and a broken curve represents the meridional image plane.

As can be seen from these graphs, according to Working Example 3, the aberrations are satisfactorily corrected at each focal length from the wide-angle end to the telephoto end even under vibration reduction.

In each Working Example discussed above, the first lens group G1 and the fourth lens group G4 are fixed when zooming. However, it is also possible, without deviating from the present invention, to make the lens group configuration such that the first lens group G1 and the fourth lens group G4 move along the optical axis when zooming. In this case, the number of degrees of freedom of aberration correction increases, making it easier to design a zoom lens that performs the effect of the present invention.

As explained above, the present invention is a high-performance zoom lens having a long back focal length, and superior imaging performance even in the intermediate focal length state. Satisfactory imaging performance can be achieved at infinite focus or then focusing on a short-distance object even under vibration correction. Accordingly, the zoom lens of the present invention is ideally suited for use with electronic imaging equipment, such as video cameras, digital still cameras, and the like.

What is claimed is:

1. A zoom lens having a long back focal length comprising, in order from an object side:

a first lens group having a positive refractive power;

a second lens group having a negative refractive power;

a third lens group having a negative refractive power;

a fourth lens group a having a positive refractive power; and a fifth lens group a having positive refractive power;

wherein the zoom lens is designed such that when zooming is effected from the wide-angle end to the telephoto end, the interval between said first lens group and said second lens group increases, the interval between said second lens group and said third lens group changes linearly or non-linearly, and the interval between said fourth lens group and said fifth lens group changes linearly or non-linearly;

wherein vibration reduction is attained by shifting a vibration reduction lens group consisting of said fourth lens group or a partial lens group of said fourth lens group in a direction substantially perpendicular to an optical axis; and wherein the following conditional formulae are satisfied:

$$\Delta 4/|f4v|<0.1$$

where f4v is a focal length of said vibration reduction lens group, $\Delta 4$ is a maximum displacement amount of said vibration reduction lens group in the direction substantially perpendicular to the optical axis upon vibration reduction.

2. A zoom lens according to claim 1, further satisfying the following conditional formulae:

$$2.0<BFw/Y0<8.0$$

$$0.03<(D23t-D23w)/fw<1.5$$

where BFw is the back focal length at the wide-angle end, Y0 is a maximum image height, fw is the focal length of the entire zoom lens system at the wide-angle end, D23w is the interval along the optical axis between said second lens group and said third lens group at the wide-angle end, and D23t is the interval along the optical axis between said second lens group and said third lens group at the telephoto end.

3. A zoom lens according to claim 2, further satisfying the following conditional formulae:

$$0.1<f2/f3<2.0$$

$$2.0<|f3|/fw<10.0$$

wherein f2 is a focal length of said second lens group, f3 is it focal length of said third lens group, and fw is the focal length of the zoom lens at the wide-angle end.

4. A zoom lens according to claim 3, wherein said first lens group and said fourth lens group is fixed during zooming from the wide-angle end to the telephoto end, and the following (condition is satisfied:

$$0.001<\Delta 4/\Phi 4<0.2$$

where $\Phi 4$ is a diameter of an effective aperture at the most object: side of said fourth lens group, and $\Delta 4$ is a maximum displacement amount of said vibration reduction lens group in the direction substantially perpendicular to the optical axis while attaining vibration reduction.

5. A zoom lens according to claim 4, wherein said fifth lens group includes a cemented lens having a divergent convex cemented surface facing to the image side.

6. A zoom lens, according to claim 5, further satisfying the following conditional formula:

$$0.3<D23m/fw<3.0$$

wherein D23m is an interval along the optical axis between the second lens group and the third lens group in an intermediate focal length state, and fw is the focal length of the zoom lens at the wide-angle end.

7. A zoom lens according to claim 6, further satisfying the following conditional formulae:

$$0.5<|f23w|/fw<2.0$$

$$0.3<D23t/fw<1.5$$

wherein f23w is a composite focal length of said second lens group and said third lens group at the wide-angle end, fw is the focal length of the zoom lens at the wide-angle end, and D23t is the interval along the optical axis between the second lens group and the third lens group at the telephoto end.

8. A zoom lens according to claim 6, wherein the fourth lens group includes a positive lens arranged at the most object side and negative lens arranged at the most image side;

the fifth lens group include a cemented lens having a divergent convex cemented surface facing to the image side; and the following conditional formula is satisfied:

$$0.18<\Delta N$$

wherein $\Delta N$ is a mean value of a difference of a refractive index for d-line between the positive lens and the negative lens of the fourth lens group, and a difference of a refractive index for the d-line between the object side lens and the image side lens that interpose the cemented surface in the fifth lens group.

9. A zoom lens according to claim 6, further satisfying the following conditional formula:

$$0.00001 < PTZ \cdot \Delta 4/f4 < 0.0001$$

wherein PZT is Petzval sum of the vibration reduction lens group, f4 is focal length of the fourth lens group, and Δ4 is a maximum displacement amount of the vibration reduction lens group in the direction substantially perpendicular to the optical axis upon vibration reduction.

10. A zoom lens according to claim 2, wherein said fifth lens group includes a cemented lens having a divergent convex cemented surface facing to the image side.

11. A zoom lens according to claim 10, further satisfying the following conditional formula:

$$0.3 < D23m/fw < 3.0$$

wherein D23m is an interval along the optical axis between the second lens group and the third lens group in an intermediate focal length state, and fw is the focal length of the zoom lens at the wide-angle end.

12. A zoom lens according to claim 10, further satisfying the following conditional formulae:

$$0.5 < |f23w|/fw < 2.0$$

$$0.3 < D23t/fw < 1.5$$

wherein f23w is a composite focal length of said second lens group and said third lens group at the wide-angle end, fw is the focal length of the zoom lens at the wide-angle end, and D23t is the interval along the optical axis between the second lens group G2 and the third lens group G3 at the telephoto end.

13. A zoom lens according to claim 10,
wherein the fourth lens group includes a positive lens arranged at the most object side and a negative lens arranged at the most image side;
the fifth lens group include a cemented lens having a divergent convex cemented surface facing to the image side; and
the following conditional formula is satisfied:

$$0.18 < \Delta N$$

wherein ΔN is a mean value of a difference of a refractive index for d-line between the positive lens and the negative lens of the fourth lens group, and a difference of a refractive index for d-line between the object side lens: and the image side lens that interpose the cemented surface in the fifth lens group.

14. A zoom lens according to claim 10, further satisfying the following conditional formula:

$$0.00001 < PTZ \cdot \Delta 4/f4 < 0.0001$$

wherein PZT is Petzval sum of the vibration reduction lens group, f4 is focal length of the fourth lens group, and Δ4 is a maximum displacement amount of the vibration reduction lens group in the direction substantially perpendicular to the optical axis upon vibration reduction.

15. A zoom lens according to claim 1, wherein said first lens group and said fourth lens group is fixed during zooming from the wide-angle end to the telephoto end, and the following condition is satisfied:

$$0.001 < \Delta 4/\Phi 4 < 0.2$$

where Φ4 is a diameter of an effective aperture at the most object side of said fourth lens group and Δ4 is a maximum displacement amount of said vibration reduction lens group in the direction substantially perpendicular to the optical axis while attaining vibration reduction.

16. A zoom lens according to claim 15, wherein said fifth lens group includes a cemented lens having a divergent convex cemented surface facing to the image side.

17. A zoom lens according to claim 15, further satisfying the following conditional formula:

$$0.3 < D23m/fw < 3.0$$

wherein D23m is an interval along the optical axis between the second lens group and the third lens group in an intermediate focal length state, and fw is the focal length of the zoom lens at the wide-angle end.

18. A zoom lens according to claim 17, further satisfying the following conditional formulae:

$$0.5 < |f23w|/fw < 2.0$$

$$0.3 < D23t/fw < 1.5$$

wherein f23w is a composite focal length of said second lens group and said third lens group at the wide-angle end, fw is the focal length of the zoom lens at the wide-angle end, and D23t is the interval along the optical axis between the second lens group and the third lens group at the telephoto end.

19. A zoom lens according to claim 17,
wherein the fourth lens group includes a positive lens arranged at the most object side and a negative lens arranged at the most image side;
the fifth lens group include a cemented lens having a divergent convex cemented surface facing to the image side; and
the following conditional formula is satisfied:

$$0.18 < \Delta N$$

wherein ΔN is a mean value of a difference of a refractive index for d-line between the positive lens and the negative leans of the fourth lens group, and a difference of a refractive index for d-line between the object side lens and the image side lens that interpose the cemented surface in the fifth lens group.

20. A zoom lens according to claim 17, further satisfying the following conditional formula:

$$0.00001 < PTZ \cdot \Delta 4/f4 < 0.0001$$

wherein PZT is Petzval sum of the vibration reduction lens group, f4 is focal length of the fourth lens group, and Δ4 is a maximum displacement amount of the vibration reduction lens group in the direction substantially perpendicular to the optical axis upon vibration reduction.

21. A zoom lens according to claim 15, further satisfying the following conditional formulae:

$$0.5 < |f23w|/fw < 2.0$$

$$0.3 < D23t/fw < 1.5$$

wherein f23w is a composite focal length of said second lens group and said third lens group at the wide-angle end, fw is the focal length of the zoom lens at the wide-angle end, and D23t is the interval along the optical axis between said second lens group and said third lens group at the telephoto end.

* * * * *